United States Patent
Kebe et al.

(10) Patent No.: US 12,548,872 B2
(45) Date of Patent: Feb. 10, 2026

(54) BALANCED BANDPASS FILTERS FOR MILLIMETER-WAVE APPLICATIONS

(71) Applicant: Khalifa University of Science and Technology, Abu Dhabi (AE)

(72) Inventors: Mamady Kebe, Abu Dhabi (AE); Baker Mohammad, Abu Dhabi (AE); Mihai Sanduleanu, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 358 days.

(21) Appl. No.: 18/041,986

(22) PCT Filed: Sep. 2, 2021

(86) PCT No.: PCT/IB2021/058041
§ 371 (c)(1),
(2) Date: Feb. 16, 2023

(87) PCT Pub. No.: WO2022/049525
PCT Pub. Date: Mar. 10, 2022

(65) Prior Publication Data
US 2023/0395960 A1 Dec. 7, 2023

Related U.S. Application Data

(60) Provisional application No. 63/082,872, filed on Sep. 24, 2020, provisional application No. 63/073,854, filed on Sep. 2, 2020.

(51) Int. Cl.
*H04B 1/40* (2015.01)
*H01P 1/203* (2006.01)
(Continued)

(52) U.S. Cl.
CPC ............ *H01P 1/2039* (2013.01); *H04B 1/40* (2013.01)

(58) Field of Classification Search
CPC ...... H01P 1/2039; H03H 7/0161; H03H 7/12; H04M 1/0277; H04B 1/40; H04B 1/04; H04B 1/16
See application file for complete search history.

(56) References Cited

U.S. PATENT DOCUMENTS

2003/0222732 A1* 12/2003 Matthaei ............. H01P 1/20381
333/204
2005/0048993 A1* 3/2005 Ammar .................... H04B 1/18
455/502
(Continued)

FOREIGN PATENT DOCUMENTS

| CN | 107946707 A | 4/2018 |
|---|---|---|
| CN | 109638395 A | 4/2019 |
| CN | 110690543 A | 1/2020 |

OTHER PUBLICATIONS

Guo et al., "Millimetre-Wave Balanced Siw Bandpass Filter With High Common-Mode Suppression", Online available at: https://ietresearch.onlinelibrary.wiley.com/doi/10.1049/el.2020.1928, Electronics Letters, vol. 56, No. 22, Oct. 29, 2020, pp. 1189-1191.
(Continued)

*Primary Examiner* — Andrew Wendell
(74) *Attorney, Agent, or Firm* — Kilpatrick Townsend & Stockton LLP

(57) ABSTRACT

This disclosure describes systems and methods for use with the design and implementation of bandpass filters for millimeter-wave applications. The filters can include an input port for receiving a signal from a signal generator, an output port, and a resonator. The resonator can be coupled between the input port and the output port. The resonator can have a T-shaped design.

20 Claims, 16 Drawing Sheets

(51) Int. Cl.
*H04B 1/03* (2006.01)
*H04B 1/04* (2006.01)

(56) References Cited

U.S. PATENT DOCUMENTS

| | | | | |
|---|---|---|---|---|
| 2006/0038708 | A1* | 2/2006 | Luh | H03M 3/408 |
| | | | | 341/143 |
| 2009/0212885 | A1* | 8/2009 | Hwang | H01P 11/008 |
| | | | | 438/669 |
| 2010/0301928 | A1* | 12/2010 | Barth | H04B 1/18 |
| | | | | 327/557 |
| 2011/0316652 | A1* | 12/2011 | Satoh | H01P 1/20345 |
| | | | | 333/204 |
| 2013/0162374 | A1* | 6/2013 | Tamiazzo | H01P 1/201 |
| | | | | 333/202 |
| 2013/0176652 | A1* | 7/2013 | Kim | H02H 9/045 |
| | | | | 361/86 |
| 2018/0152210 | A1* | 5/2018 | Araki | H04B 1/40 |
| 2020/0176842 | A1* | 6/2020 | Miyamoto | H01P 1/207 |
| 2021/0067125 | A1* | 3/2021 | Nielsen | H03H 7/12 |

OTHER PUBLICATIONS

Application No. PCT/IB2021/058041, International Search Report and Written Opinion, Mailed On Nov. 19, 2021, 12 pages.

Prigent et al., "Bandpass Filter for Millimeter-Wave Applications up to 220 GHz Integrated in Advanced Thin SOI CMOS Technology on High Resistivity Substrate", Available online at: https://ieeexplore.ieee.org/document/4405282, 2007 European Microwave Conference, Oct. 2007, pp. 676-679.

Shaman et al., "Millimeter-Wave Ultra-Wideband (UWB) Bandpass Filter (BPF) Using Microstrip Parallel Coupled Lines", Online available at: https://ieeexplore.ieee.org/document/7565096, 2016 IEEE Wireless Communications and Networking Conference, Apr. 2016, 4 pages.

* cited by examiner

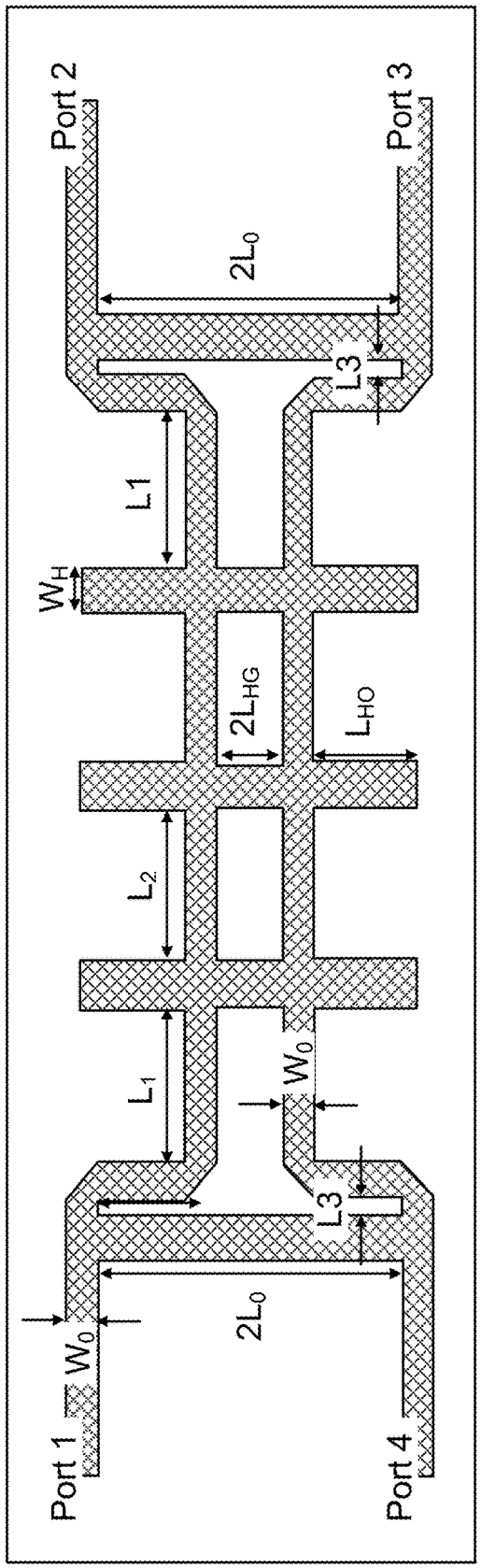
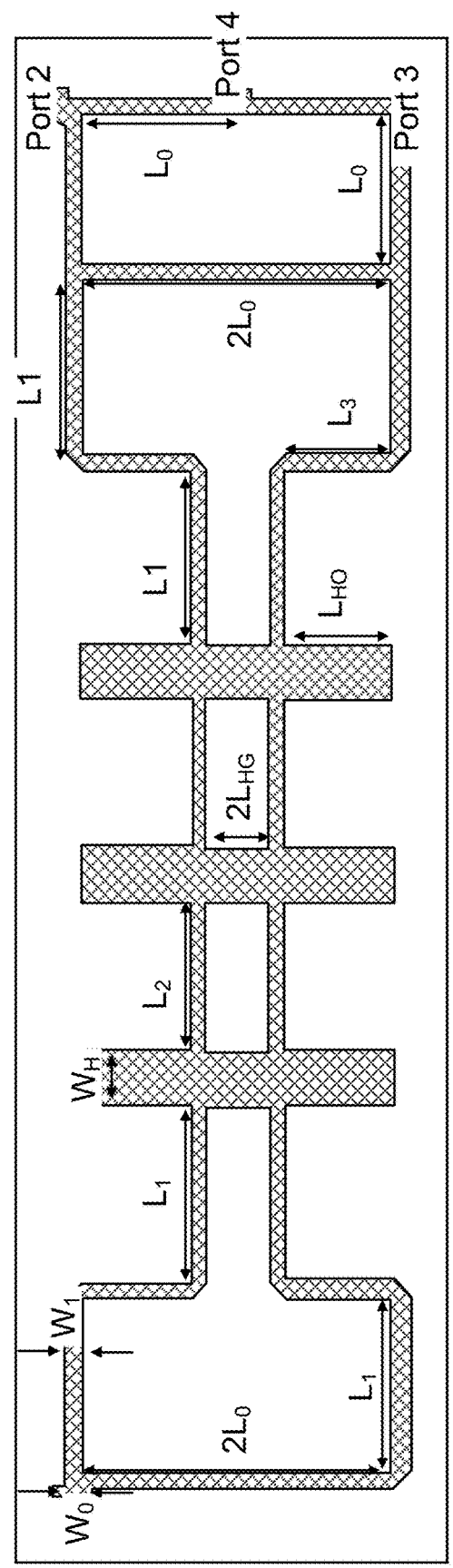
FIG. 8A
FIG. 8B

BALANCED BANDPASS FILTERS FOR MILLIMETER-WAVE APPLICATIONS

CROSS-REFERENCE TO RELATED APPLICATIONS

This application claims the benefit of and priority to U.S. Provisional Application No. 63/073,854, filed on Sep. 2, 2020, and titled "BALANCED BANDPASS FILTERS FOR MILLIMETER-WAVE APPLICATIONS," and U.S. Provisional Application No. 63/082,872, filed on Sep. 24, 2020, and titled "BALANCED BANDPASS FILTERS FOR MILLIMETER-WAVE APPLICATIONS," the contents of both of which are herein incorporated by reference in their entireties for all purposes.

BACKGROUND

Advanced communication systems can utilize reliable and low-cost electronic devices. For example, electronic devices that operate at millimeter-wave (mmwave) frequencies. These electronic devices can increase the speed, throughput, and bandwidth of the communication systems. The electronic devices often utilize filters, for example, Bandpass filters (BPFs). However, many of the currently available filters may limit the capabilities of the electronic devices and the communication systems. For example, many of the filters may limit the capabilities of the electronic devices due to their architecture and/or tuning.

SUMMARY

Telecommunication systems, for example, fifth generation (5G) telecommunication systems, utilize reliable and low-cost electronic devices operating in mm-Wave frequencies (e.g., 30 GHz). Many communication devices used in these telecommunication systems, for example, mobile and automotive systems, utilize RF front-ends with transceivers. Many of these transceivers can use bandpass filters (BPFs), for example, for signal selection. As described herein, bandpass filters can be based on transmission line hybrid T-resonators and include differential input, differential output (DIDO) and/or differential/single-ended input, single-ended/differential output (DISO/SIDO) configurations. The bandpass filters described herein can have higher selectivity, common-mode (CM) suppression, and/or upper stopband attenuation when compared with known filters. These bandpass filters can be or include a balanced microstrip bandpass filter based on a printed circuit board (PCB) at mm-Wave frequencies.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 8A shows a layout of a fully differential bandpass filter, according to various embodiments;

FIG. 8B shows a layout of a single input, dual output/dual input, dual output bandpass filter, according to various embodiments;

DETAILED DESCRIPTION

Figure 1A:
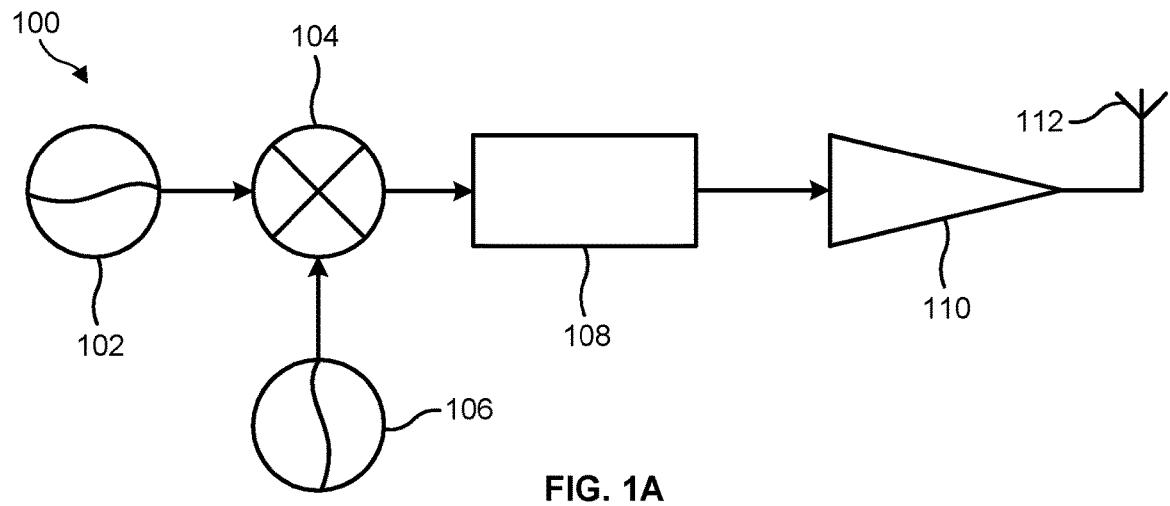
FIG. 1A shows a block diagram of known single-ended transmitter.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Communication systems often utilize transceivers. Transceivers include filters, for example, Bandpass filters (BPFs). BPFs are used for transceivers, for example, for signal selection. There are various types of filters (e.g., different types of BPFs) that can be used. However, many of these filters have their own distinct advantages and disadvantages. For example, Millimeter-Wave BPFs can be used with transceivers. The Millimeter-Wave BPFs can be active or passive circuits. However, passive filters are often preferable because of their higher linearity, selectivity, and lower or no power dissipation.

Surface/bulk acoustic wave (SAW/BAW) filters can be used in mobile communication systems because the SAW/BAW filters have high power capability and selectivity. However, their applications may be limited to frequencies below 10 GHz.

Lumped elements-based filters can be implemented at mm-Wave frequencies with decent insertion loss. However, the lumped elements-based filters may suffer from lower selectivity, for example, due to high out-of-band suppression used for better channel selection.

Substrate-integrated waveguide (SIW) filters have been used for mm-Wave applications due to their relative lower insertion loss. However, the SIW filters may not be compatible for advanced CMOS integration which is used for device miniaturization.

BPFs may use passive mm-wave transmission lines such as microstrip lines and/or coplanar waveguides, for example, due to their high integration capabilities.

Differential-mode (DM) filters can be used because of their higher immunity to noise, crosstalk and electromagnetic (EM) interference compared to single-ended counterparts filters. Since high frequencies are associated with higher noise level, which is a CM signal, balanced or DM filters can be used for signal-to-noise ratio (SNR) augmentation at mm-wave frequencies. With differential output designs, a differential LNA can be used. The differential LNA can have a low even-order distortion which can allow for the use of homodyne receivers and transmitters. The single-ended-to-balanced filter can be implemented in conjunction with a single-ended antenna in receiver/transmitter architectures without the need for a BALUN.

Despite their recent attraction in microwave applications, most of the currently reported balanced filters operate at frequencies below the X-band, and do not consider the design for mm-wave/Ka bands which are associated with several loss mechanisms including the higher modes as well as radiation loss that degrade the performance of the microstrip based filters.

Examples herein are directed to bandpass filters (BPFs). The BPFs can include resonators that determine the center frequency and/or the bandwidth of the filter. The resonator can be constructed using transmission line T-structures and/or edge coupled lines. Various parameters can affect the center frequency and/or the bandwidth of the BPFs.

Figure 1B:
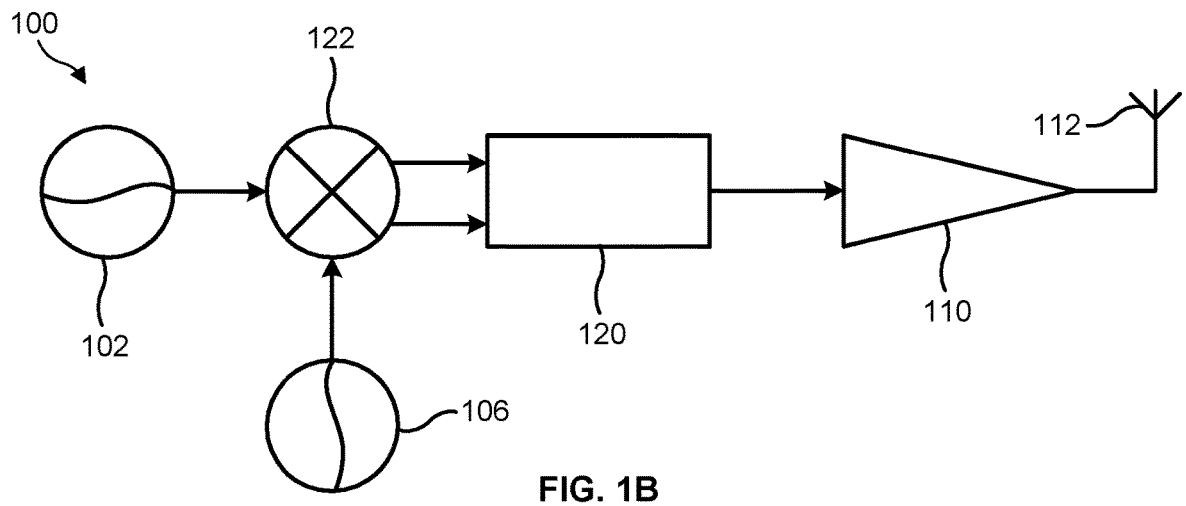
FIG. 1B shows a block diagram of known single-ended transmitter with a DIDO filter.
Figure 1C:
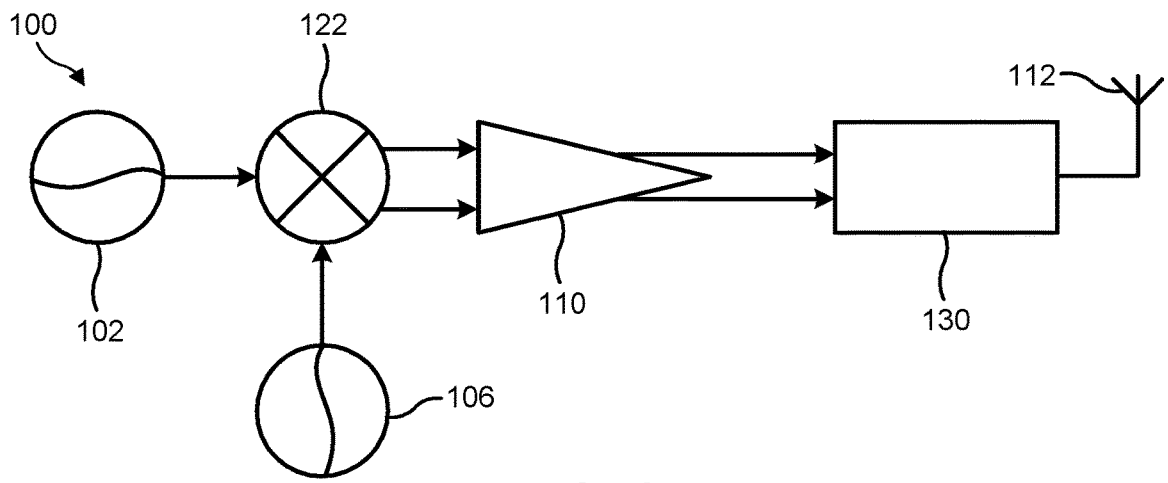
FIG. 1C shows a block diagram of a known single-ended transmitter with a DISO filter.
Figure 1D:
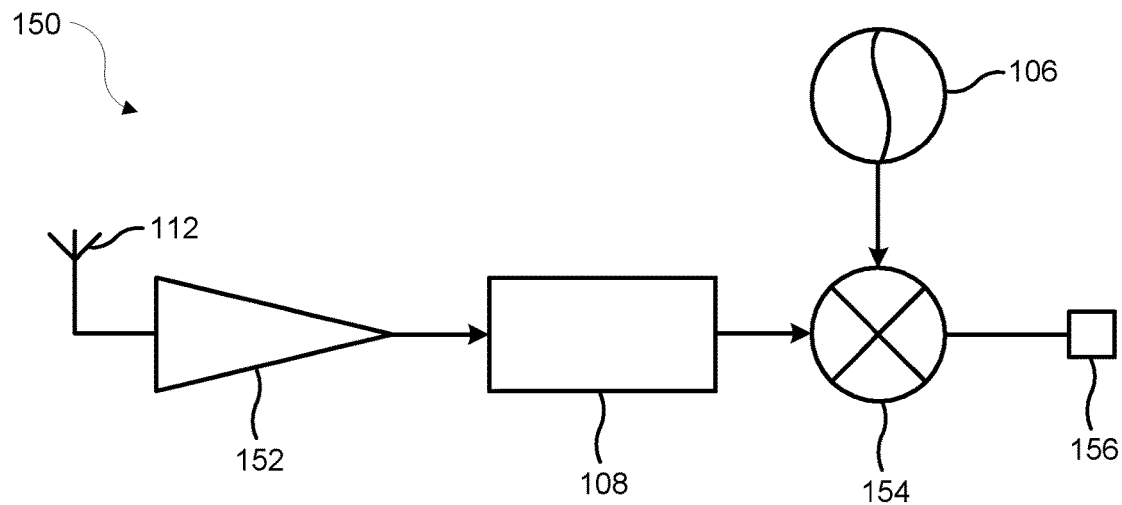
FIG. 1D shows a block diagram of a known single-ended receiver.
Figure 1E:
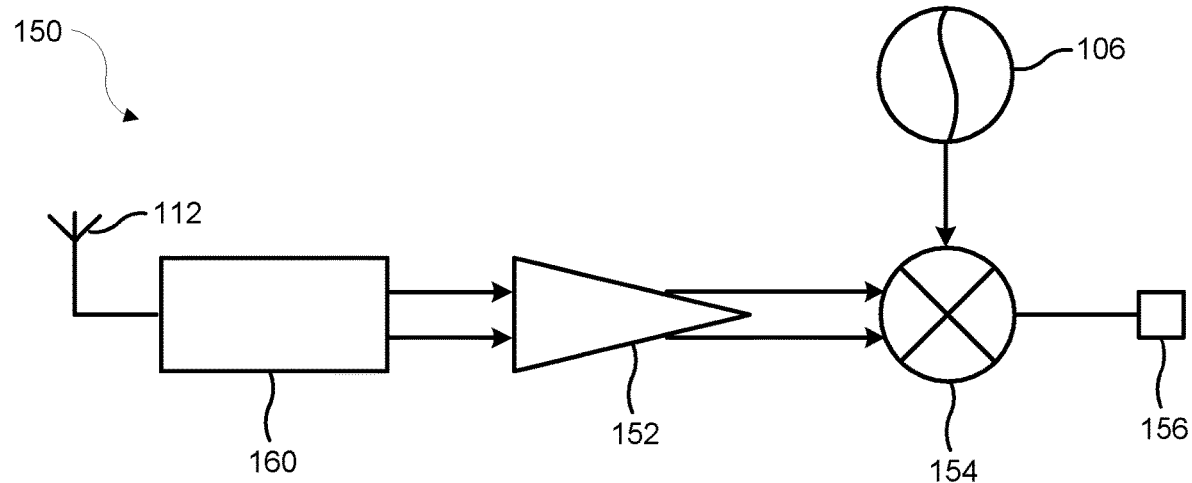
FIG. 1E shows a block diagram of known single-ended receiver with a SIDO filter.

Turning to FIGS. 1A through 1E, block diagrams of known balanced filters are shown. The balanced filters can be differential input, differential output (DIDO), single input, differential output (SIDO), or differential input, single output (DISO). FIG. 1A is a block diagram showing a known single-ended transmitter 100. FIG. 1B is a block diagram showing a known transmitter with a DIDO filter 120. FIG. 1C is a block diagram showing a known transmitter with a DISO filter 130. FIG. 1D is a known single-ended receiver 150. FIG. 1E is a known receiver 150 using a SIDO filter 160.

FIG. 1A shows the known single-ended transmitter 100 including a signal generator 102. The signal generator 102 can be coupled with an up-converter mixer 104. The up-converter mixer 104 can additionally or alternatively receive a signal from a local oscillator 106. The up-converter mixer 104 can be coupled with a bandpass filter 108 (e.g., the bandpass filter 108 can receive a signal from the up-converter mixer 104). The bandpass filter 108 can be coupled with and send a signal to a power amplifier 110. The power amplifier 110 can be coupled with and send a signal to an antenna 112.

FIG. 1B shows the single-ended transmitter 100 with a DIDO filter 120. The signal generator 102 and the local oscillator 108 can be coupled with and input a signal into a balanced up-converter 122. The balanced up-converter 122 can be coupled with the dual input, dual output bandpass filter 120. The dual input, dual output bandpass filter 120 can receive multiple inputs from the balanced up-converter 122. The dual input, dual output bandpass filter 120 can be coupled with and output multiple outputs to the power amplifier 110. The power amplifier 110 can be coupled with and output a signal to the antenna 112.

FIG. 1C shows the single-ended transmitter 100 with a dual input, single output filter 130. The signal generator 102 and the local oscillator 106 can be coupled with and input a signal into the balanced up-converter 122. The balanced up-converter 122 can be coupled with and output multiple signals to the power amplifier 110. The power amplifier 110 can be coupled with and output multiple signals to the dual input, single output bandpass filter 130. The dual input, single output bandpass filter 130 can be coupled with and output a signal to the antenna 112.

FIG. 1D shows a known single-ended receiver 150. An antenna 112 can be coupled with and input a signal to a low-noise amplifier 152. The low-noise amplifier 152 can be coupled with and output a signal to a bandpass filter 108. The bandpass filter 108 can be coupled with and send a signal to a down-converter 154. The down-converter 154 can be coupled with and receive a signal from a local oscillator 106 and output a signal to an I/Q baseband 156.

FIG. 1E shows a single-ended receiver 150 with a single input, dual output bandpass filter 160. The antenna 112 can be coupled with and send a signal to the single input, dual output bandpass filter 160. The bandpass filter 160 can be coupled with and output multiple signals to a low-noise amplifier 152. The low-noise amplifier 152 can be coupled with and output multiple signals to a balanced down-converter 154. The balanced down-converter 154 can be coupled with and receive a signal from a local oscillator 106. The local oscillator 106 can be coupled with and output a signal to an I/Q baseband 156.

Figure 2A:
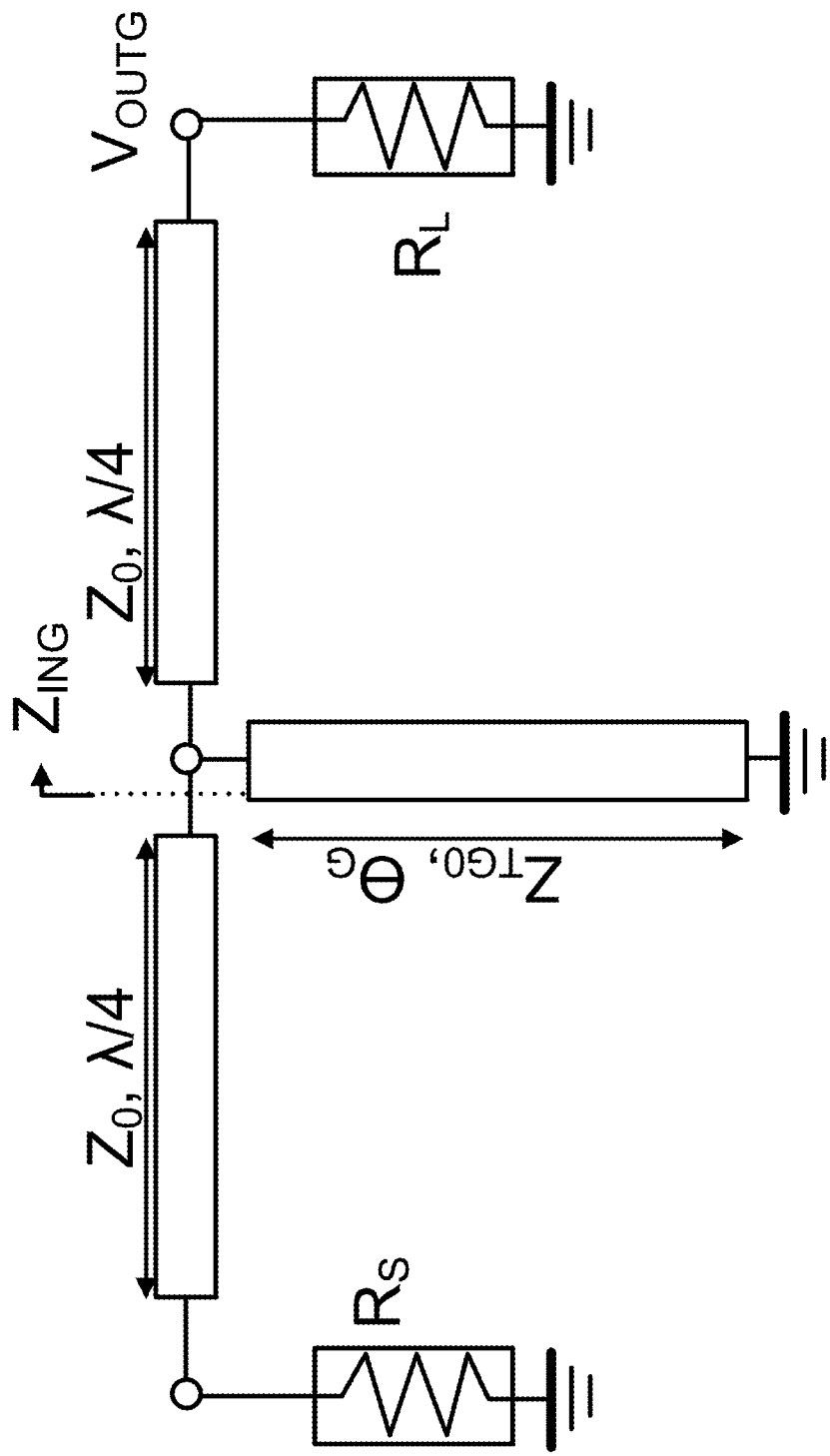
FIG. 2A shows an example of a grounded microstrip resonator, according to various embodiments.
Figure 2B:
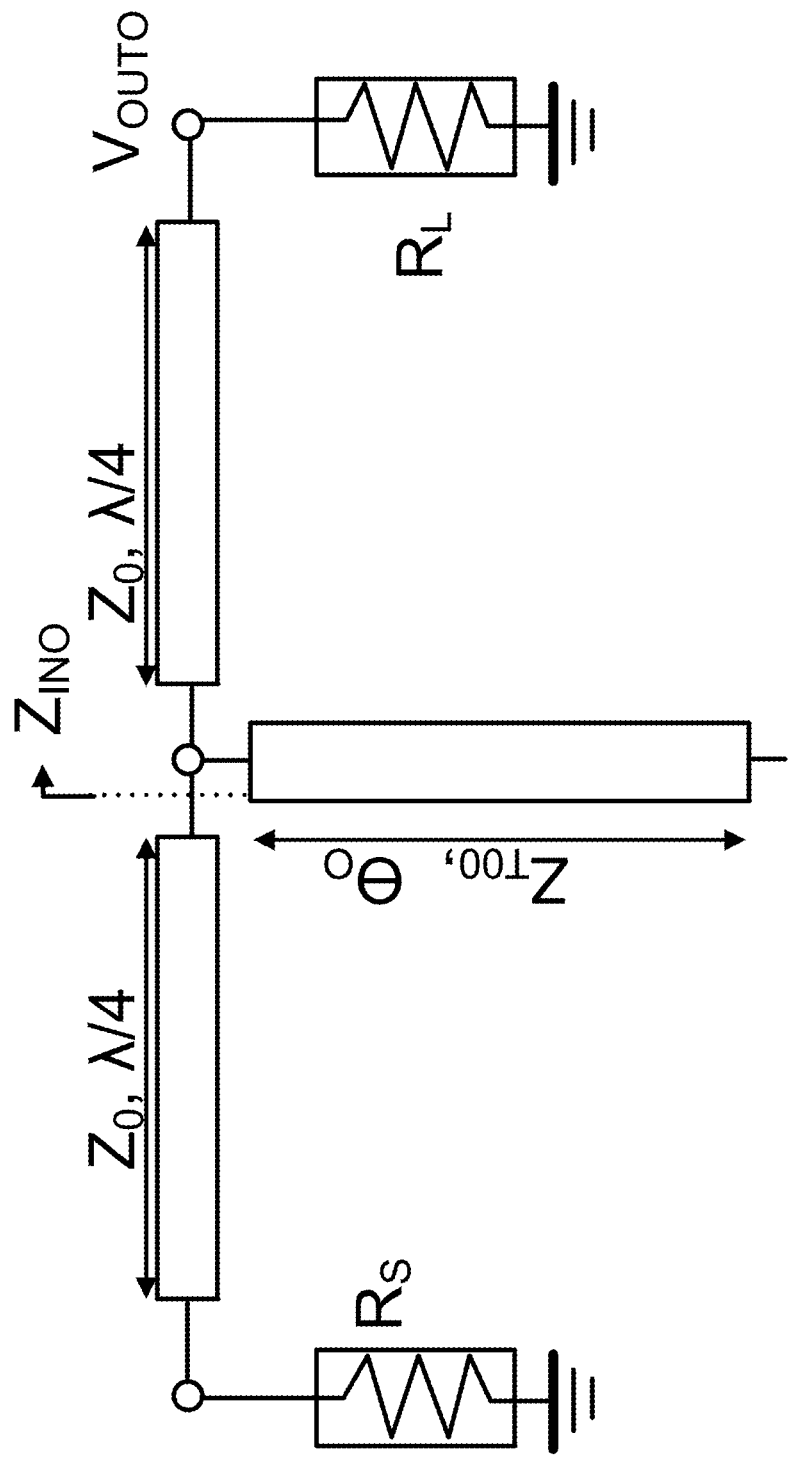
FIG. 2B shows an example of an open microstrip resonator, according to various embodiments.
Figure 2C:
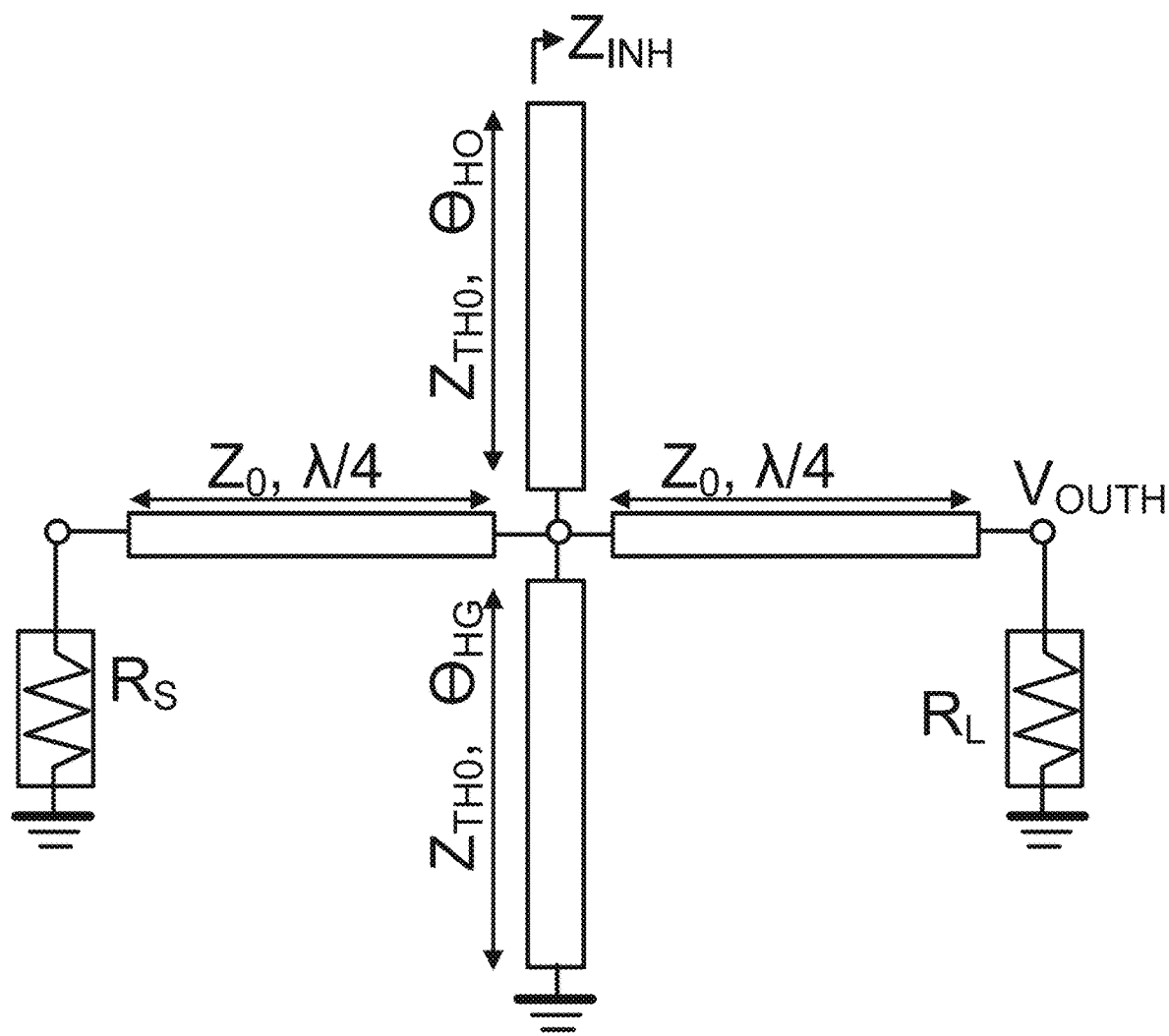
FIG. 2C shows an example of a hybrid microstrip resonator, according to various embodiments.

Bandpass filter (BPFs) can be or include resonators. The resonators can be used to determine the center frequency and/or the bandwidth of the filter. The resonator can be constructed using transmission line T-structures and/or edge coupled lines. Turning to FIGS. 2A through 2C, example T-structure microstrip resonators are shown. The tail of the T-structure can be either grounded (FIG. 2A), open (FIG. 2B), or a hybrid of open and grounded lines (FIG. 2C). The T-structure can provide capacitive and/or inductive effects, which can result in a resonance at a specific frequency. This frequency is called the resonance frequency and ideally allows full signal transmission from the input signal to the output port.

The input impedance of the grounded T-resonator 200 in FIG. 2A can be expressed using the equation (1):

$$Z_{ING} = j\frac{R_L Z_{TG0}\tan\theta_G}{R_L + jZ_{TG0}\tan\theta_G},$$

where $R_L$, $Z_{TG0}$, and $\theta_G$ are the load impedance, the characteristic impedance and the electrical length of the resonator tail, respectively. Assuming the source impedance $R_s$ equals the load impedance $R_L$ ($R_s=R_L=Z_0$), the input and output reflection coefficient is found as using equation (2):

$$\Gamma_{ING} = \Gamma_{OUTG} = \frac{Z_0 - Z_{ING}}{Z_0 + Z_{ING}} = \frac{Z_0}{Z_0 + j2Z_{TG0}\tan\theta_G}.$$

Furthermore, as the length of the line from the T-junction to the load equals a quarter-wave length, the voltage across the output load terminal is found using equation (3):

$$V_{OUTG} = jV_{ING}^+(\Gamma_{OUTG} - 1) = \frac{2Z_{TG0}\tan\theta_G}{Z_0 + j2Z_{TG0}\tan\theta_G} V_{ING}^+$$

where $V_{ING}^+$ is the forward input voltage. The scattering matrix coefficients are determined from equations using $$S_{11} = S_{22} = \Gamma_{ING} = \Gamma_{OUTG} = \frac{Z_0}{Z_0 + j2Z_{TG0}\tan\theta_G} \text{ and}$$

$$S_{21} = S_{12} = \frac{V_{OUTG}}{V_{ING}^+} = -j\frac{2Z_{TG0}\tan\theta_G}{Z_0 + j2Z_{TG0}\tan\theta_G}.$$

For input/output matching and total transmission of the input source voltage to the load, the following condition must be satisfied: $Z_{TG0}\tan\theta_G=\infty$. Therefore, $$l_{G,res} = \frac{(k+1)\pi}{2} \times \frac{\lambda}{2\pi} = (2k+1)\frac{\lambda}{4},$$

where $\beta$, $\lambda$, and $l_{G,res}$ are the phase constant, the wavelength and the physical length of the transmission line at the resonance frequency, respectively and k=0, 1, 2 . . . .

The grounded T-structure transmission network can resonate at multiples of the quarter-wave frequency corresponding to the physical length of the tail of the network. The S-matrix at the resonance frequency ideally becomes:

$$s_{TG} = \begin{bmatrix} 0 & 1 \\ 1 & 0 \end{bmatrix}$$

The impedance of the tail $Z_{TG0}$ does not ideally affect the matching and the transmissivity of the network at the resonance frequency. However, it can affect the bandwidth of the structure. To have a full transmission of the source voltage to the load at all frequencies, it is ideally desired to have $Z_{TG0}$ equals to infinity. As the value of $Z_{TG0}$ converges to zero, the bandwidth becomes narrow. This property of the T-resonators is important for adjusting the bandwidth and the stopband attenuation of the overall filter.

No voltage is seen at the load for frequencies where multiples of half-wavelengths correspond to the physical length of the line, forming a notch at these frequencies. In another word, a voltage transmission zero (TZ) occurs when the length of the tail equals multiples of the half-wavelength. This characteristic is substantial for improving the selectivity and stopband attenuation of the filter.

The S-parameters of an open-ended T structure (FIG. 2B) can be expressed by $$S_{11} = S_{22} = \Gamma_{INO} = \Gamma_{OUTO}\frac{jZ_0\tan\theta_O}{2Z_{T00} + jZ_0\tan\theta_O} \text{ and}$$

$$S_{21} = S_{12} = \frac{V_{OUTO}}{V_{INO}^+} = \frac{-j2Z_{T00}}{2Z_{T00} + jZ_0\tan\theta_O}.$$

For $\theta_O = \beta l_O = (2k+1)\pi/2$ the S-matrix reduces to $$s_{TO} = \begin{bmatrix} 1 & 0 \\ 0 & 1 \end{bmatrix}.$$

A TZ can be formed when the tail length of the open-ended T-resonator is equivalent to the quarter-wavelength or its multiples. Furthermore, when $\theta_o=\beta l_o=(k+1)\pi$, the structure can be matched to the input and output impedances with full transmission. The open-ended T-structure can resonate at multiples of the frequency where the length of the tail equals the half-wavelength.

$$l_{O,res} = (2k+1)\frac{\lambda}{2}$$

where k=0, 1, 2, . . . . Similar to the shorted T-resonator previously discussed, the impedance of the tail line $Z_{TG0}$ does not alter the signal insertion and reflection at the resonance frequency. However, it prevails the bandwidth of the resonator as larger tail impedance results into smaller bandwidth.

As shown in FIG. 2C, the hybrid T-resonator can be constructed by connecting edge-to-edge an open tail line to a shorted one. Assuming the load and source impedances are the same, the reflection coefficient and insertion loss of the hybrid T-structure is given by:

$$S_{11} = S_{22} = \frac{jZ_0(\tan\theta_{HG}\tan\theta_{HGO} - 1)}{2Z_{TH0}\tan\theta_{HG} + jZ_0(\tan\theta_{HG}\tan\theta_{HO} - 1)}$$

and $$S_{21} = S_{12} = \frac{V_{OUTH}}{V_{INH}}\frac{-2Z_0(\tan\theta_{HG})}{2Z_{TH0}\tan\theta_{HG} + jZ_0(\tan\theta_{HG}\tan\theta_{HO} - 1)}.$$

The resonance frequency of the hybrid T-resonator can be found when $S_{11}=0$ and $S_{21}=1$. These conditions lead to the following equations $\tan\theta_{HG}\tan$ $$\theta_{HO} - 1 = 0$$

or $$\theta_{HG} + \theta_{HO} = \frac{(2k+1)\pi}{2}$$

where where k=0, 1, 2 . . . . The length of the open and grounded tails can be found using $$l_{HG,res} + l_{HO,res} = (2k+1)\frac{\lambda}{4}.$$

The hybrid T-structure can resonate and frequencies (and multiples) where the quarter-wavelength equals the sum of the effective lengths of the open and shorted tails.

The bandwidth of the hybrid microstrip T-resonator can be controlled by both the characteristic impedance $Z_{TH0}$ of the tail lines and the length of the shunted tail (or open tail). Similar to the aforementioned simple grounded, decreasing $Z_{TH0}$ results into a narrow band resonator and vice-versa. On the other hand, by increasing the length of the open-ended tail, we create a transmission zero closer to the resonance frequency at the right-hand side of the frequency scale, decreasing the bandwidth of the resonator.

There can be a limitation to the minimum characteristic impedance value the tails of the resonator can have. For instance, it is unpractical to increase the width of the tail more than the quarter-wavelength due to the effect of the transverse resonance. The transverse resonance occurs when the width of the microstrip line is comparable to the quarter-wavelength, causing an increase in the waveguide transverse magnetic (TM) mode. The transverse resonance of a microstrip line can be approximated by $$f_{TR} \approx \frac{c}{2\sqrt{\epsilon_r}(W+d/2)} = \frac{\lambda f_{res}}{2(W+d/2)},$$

where c is the speed of the light, $\epsilon_r$ the dielectric constant of the substrate, d the substrate thickness, W the physical width of the microstrip line, $\lambda$ the wavelength and $f_{res}$ the resonance corresponding to $\lambda$.

The transverse resonance can equal the center or resonance frequency when the effective width of the microstrip line (W+d/2) is equivalent to the quarter-wavelength ($\lambda/2$). Since the physical width of the line is inversely proportional to its characteristic impedance, the value of $Z_{TH0}$ must be high enough to keep the transverse resonance frequency far away from the resonance frequency of the structure. Moreover, as the width of the line increases, higher waveguide TM modes are transmitted. Therefore, more insertion loss of the line are induced.

On the other hand, the minimum bandwidth of the hybrid resonator can be determined by the length of the open-or closed-ended tail. Meanwhile, the closed-ended tail must be longer than the width to avoid TM coupling. Note that as the length of the open-ended tail increases, a TZ is created closer to the resonance frequency.

Figure 3A:
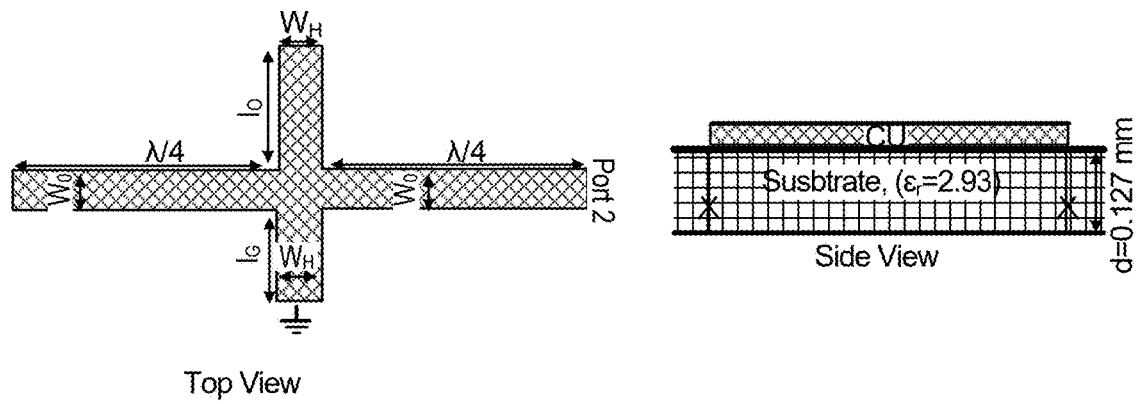
FIG. 3A shows an example substrate for use with a hybrid T-resonator, according to various embodiments.
Figure 3B:
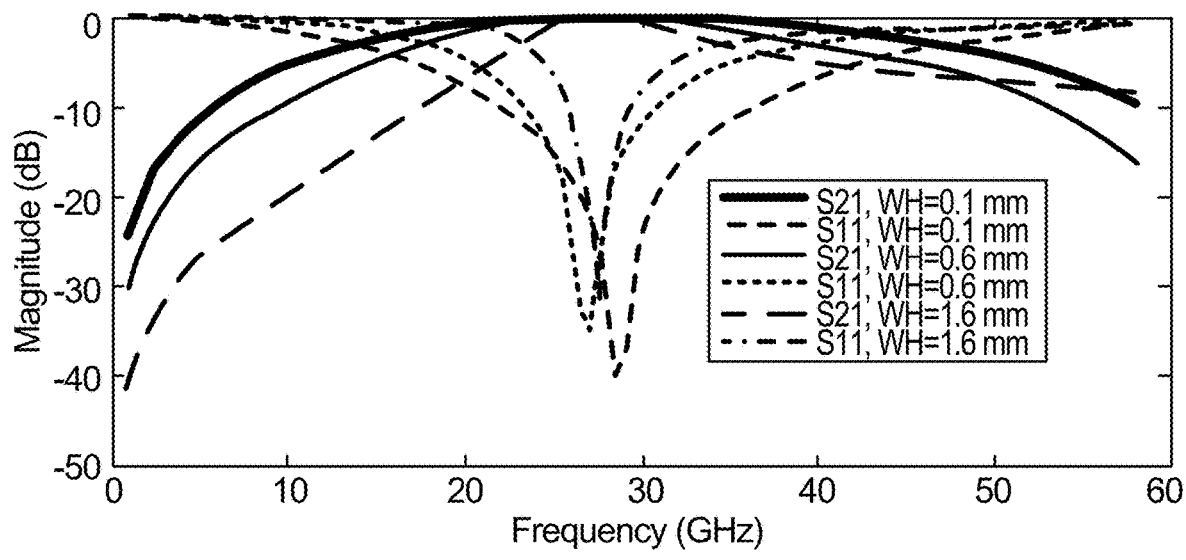
FIG. 3B shows a graph charting the magnitude and frequency of S-parameter for different tail width value of a hybrid T-resonator, according to various embodiments.
Figure 3C:
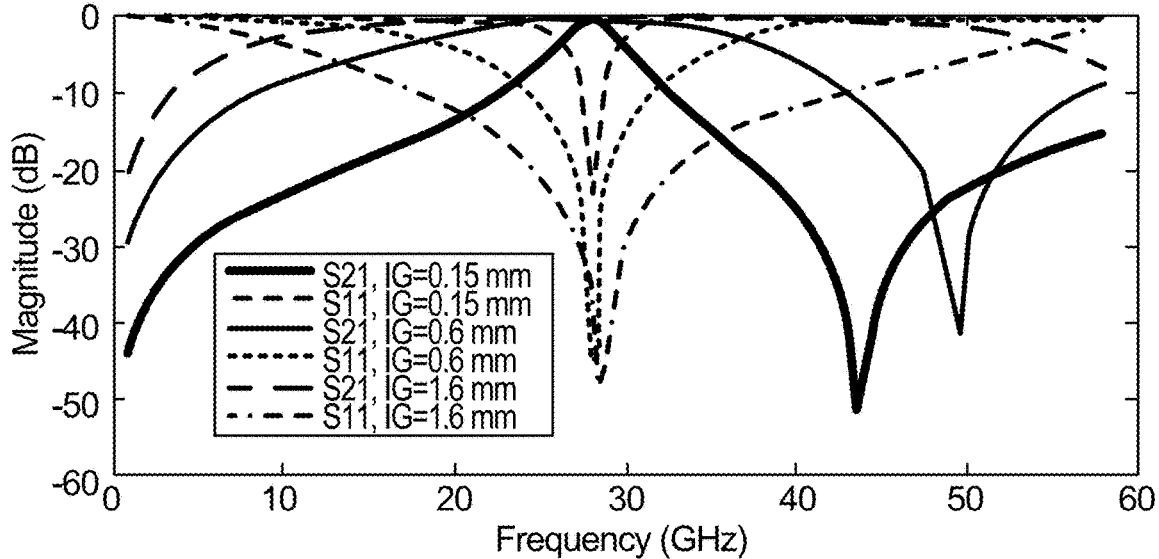
FIG. 3C shows a graph charting the magnitude and frequency of S-parameters for different length values of a grounded tail of a hybrid T-resonator, according to various embodiments.

Turning to FIGS. 3B and 3C, a simulated result of hybrid microstrip T-resonators designed at 28 GHz with different tail lengths and widths is shown. The substrate used is shown in FIG. 3A. The substrate can have a dielectric constant of 2.93 and a substrate thickness of 0.127 mm. As demonstrated by FIGS. 3B and 3C, more efficient band tuning can be obtained by varying the length of the tails rather than its width because narrower band and lower insertion loss can be obtained by tuning the tail lengths.

A bandpass filter can be designed by employing one or more T-resonator in cascade connection. The number of resonator stages determine the order of the filter. Therefore, more stages lead to better selectivity and stopband attenuation, but at the cost of more insertion loss. However, the hybrid resonator sections dominate the overall selectivity, insertion loss and bandwidth. The input and output matching is maintained for higher order BPF, as well as inter-matching between the stages as long as the resonators are separated by 50$\Omega$, quarter-wave lines. Nevertheless, microstrip BPF experience relatively high insertion loss at millimeter-wave frequencies due to a number of loss mechanisms.

Microstrip lines exhibit a number of loss mechanisms at higher frequencies. These include mainly the conductor loss, the substrate loss, the radiation loss and the effect of higher order transmission modes. These losses constitute the main limitations of microstrip lines at millimeter-wave frequencies. Moreover, it is import to look into each loss phenomenon in order to select an appropriate substrate for the design.

The conductor loss or ohmic loss corresponds to the attenuation associated with the finite conductivity of the conducting material of the transmission line. The attenuation coefficient of a microstrip line can be approximated by $$\alpha_c = \frac{R_S \int i_S^2 dl}{2 \int \upsilon \epsilon_C (\nabla \psi)^2 dS} = \frac{R_S}{Z_0 W}[N_p/m]$$

where $\upsilon$ is the phase velocity, $\epsilon_c$ the dielectric constant of the conductor, $i_s$ the surface current density of the conductor, $\psi$ the potential distribution along the line, $Z_0$ the characteristic impedance of the line, W, the width of the line and $R_s$ the surface resistivity of the conductor.

Since the conductivity of metals such as copper is very high (5.88*10$^{07}$), the loss experienced by a microstrip transmission line due to ohmic attenuation is relatively low in the lower band of millimeter-wave frequencies. For instance, the total ohmic loss of 50$\Omega$ microstrip line at 28 GHz with 10 mm length using the substrate in FIG. 3A is about 0.123 dB. However, the total conductor loss increases with the length of the line.

The loss related to the dielectric material of the substrate plays a significant role in the net insertion loss of microstrip lines. This loss is associated to the relative permittivity ($\epsilon_r$) of the dielectric material, which is more or less a complex number. The dielectric attenuation is due to the presence of an imaginary part in the expression of the dielectric permittivity. Assuming the transmission line is in quasi-transverse electromagnetic mode (TEM), the dielectric loss can be expressed by $$\alpha_d \cong \frac{k_0 \epsilon_r (\epsilon_e - 1) \tan \delta}{2(\epsilon_r - 1)\sqrt{\epsilon_e}}[N_p/m]$$

where $k_0 = 2\pi f/c$ is the free space propagation constant and $\epsilon\_e$ the effective dielectric constant of the substrate. From the equation, it can be determined that the dielectric loss increases with frequency. The total dielectric loss of a 10 mm-long, 50$\Omega$ microstrip line at 28 GHz using the substrate in FIG. 3A is 0.068 dB, given that the loss tangent is around 0.0019. It is important to select substrate with lower loss tangent for millimeter-Wave applications. By using higher conductive conductors and lower loss tangent dielectric substrates, the ohmic and dielectric losses can be reduced significantly. However, another loss mechanism occur at high frequencies: electromagnetic coupling due to higher orders transmission modes.

Microstrip lines exhibit radiation loss, which is dependent on the frequency and substrate parameters of the PCB as given by $$\alpha_r = 60 \frac{2\pi h}{\lambda_0} F(\mathit{eff}) [\text{Np/m}]$$

where h and $\lambda_0$ are the substrate height and the wavelength. F(eff) is a function of the effective permittivity of the substrate. Its value varies for the open-stub and the matched line cases. The values of F(eff) for the matched and the open-stub lines using the substrate in FIG. 3A are about 0.697 and 1.09, respectively. The corresponding radiation losses are 4.7 dB/m and 7.38 dB/m, respectively. Therefore, there is not much radiation loss associated with the aforementioned substrate.

At frequencies close to DC, the microstrip transmission line can be assumed to be only in quasi-TEM mode. However, as the frequency of operation increases, higher TM and TE modes start to appear as can be seen from their cutoff frequency expressions in $$f_{TM,cn} = \frac{nc}{2d\sqrt{\epsilon_r - 1}}$$

and $$f_{TE,cn} = \frac{(2n-1)c}{4d\sqrt{\epsilon_r - 1}}$$

where $n = 0, 1, 2, \ldots$

The first surface TM mode cutoff frequency of a dielectric substrate with ground plane is 0. As the frequency of the operation increases, the TM mode wave aligns with the quasi-TEM mode wave leading to unwanted signal coupling and power loss.

The critical frequency for the substrate described in FIG. 3A is around 82 GHz, which is fairly bigger than the target center frequencies between 28 and 30 GHz. Furthermore, the TE1 mode becomes important when the frequency of operation converges to millimeter-wave frequencies. Line discontinuities such as bends and junctions allows unwanted current coupling leading to power loss. The threshold frequency of this effect correspond to the cutoff frequency at TE1 and is expressed by $$f_{TE,cn} = \frac{c}{4d\sqrt{\epsilon_r - 1}}.$$

This frequency is relatively higher. For instance the TE1 surface waveguide cutoff frequency of the substrate in FIG. 2(a) is approximately 425 GHz.

Figure 4A:
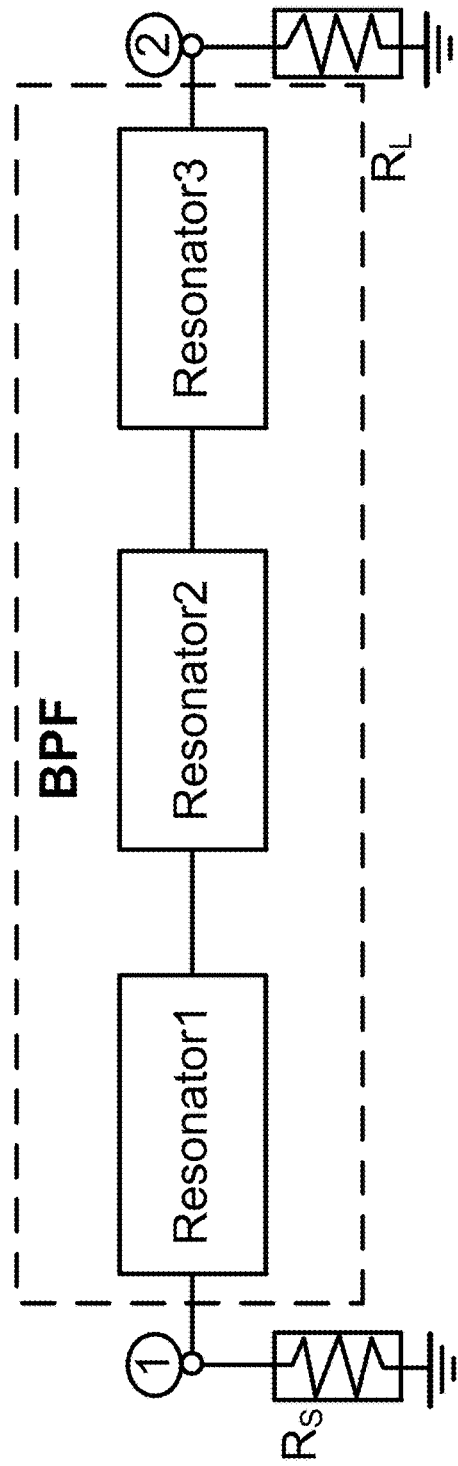
FIG. 4A shows a block diagram of a microstrip bandpass filter, according to various embodiments.
Figure 4B:
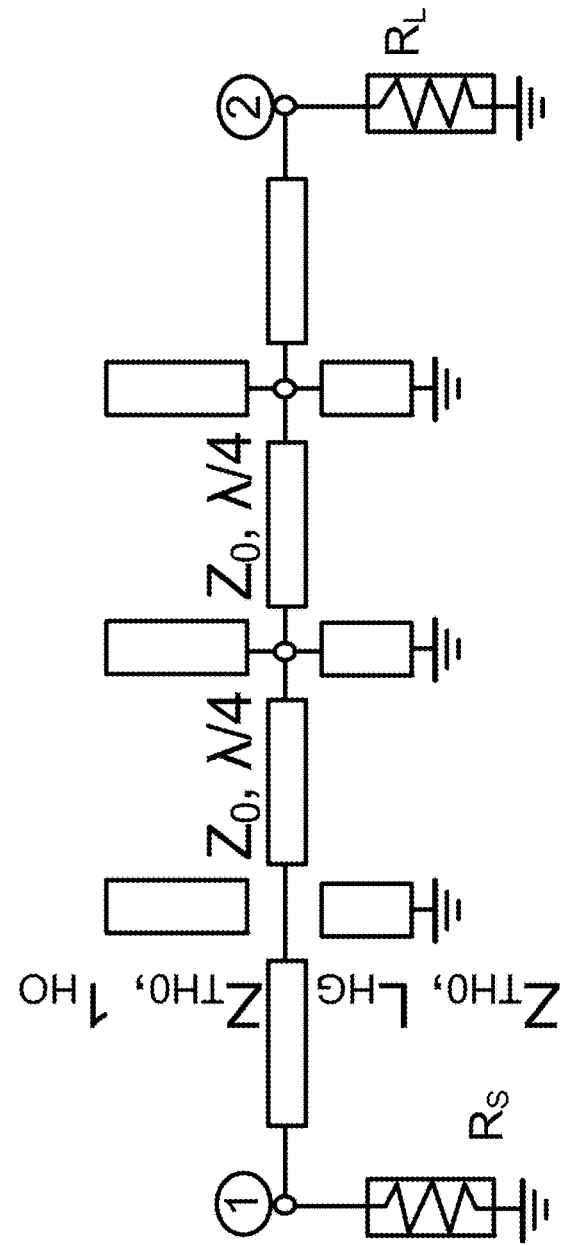
FIG. 4B shows a single-ended microstrip bandpass filter, according to various embodiments.
Figure 4C:
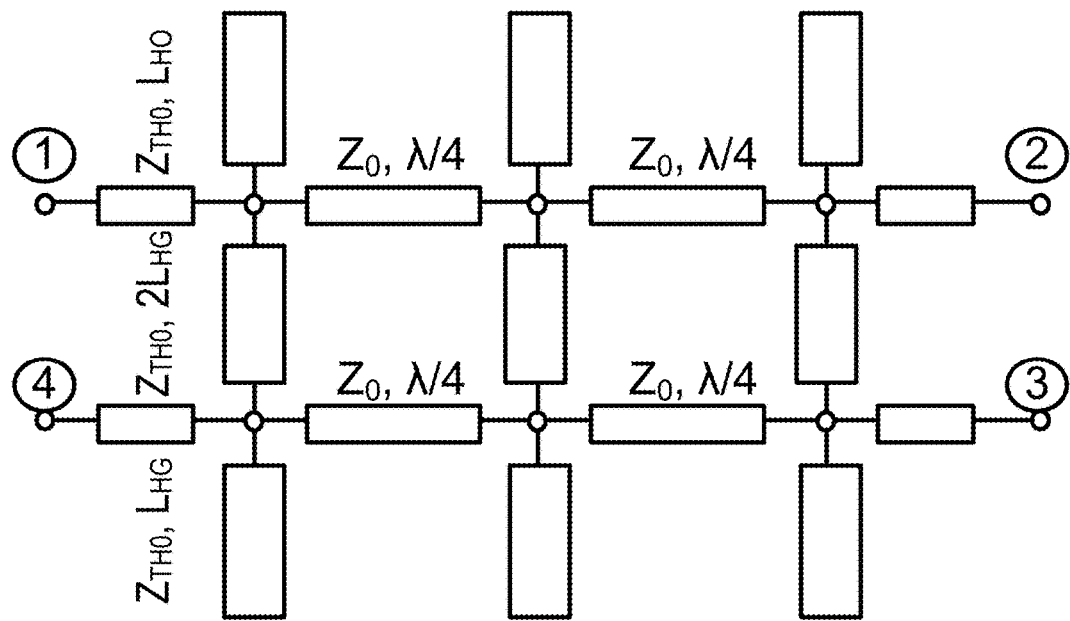
FIG. 4C shows a differential with low common-mode rejection bandpass filter, according to various embodiments.

Turning to FIGS. 4A through 4D, a BPF is shown which can include several cascading T-resonators. FIG. 4B shows a single-ended BPF composed of identical hybrid T-resonator. The resonators can be separated by a 90° phase. This can allow impedance matching between them. The corresponding differential BPF is obtained by cascading the BPF in FIG. 4B as seen in FIG. 4C. Nevertheless, the Filter in FIG. 4C is not fully differential as the line separating the output ports 2 and 3 (and the input ports 1 and 2) does not equal a half-wavelength. To obtain a fully differential structure, a half-wavelength line connecting the two inputs and outputs can be added, leading to the structure shown in FIG. 4D.

Figure 4D:
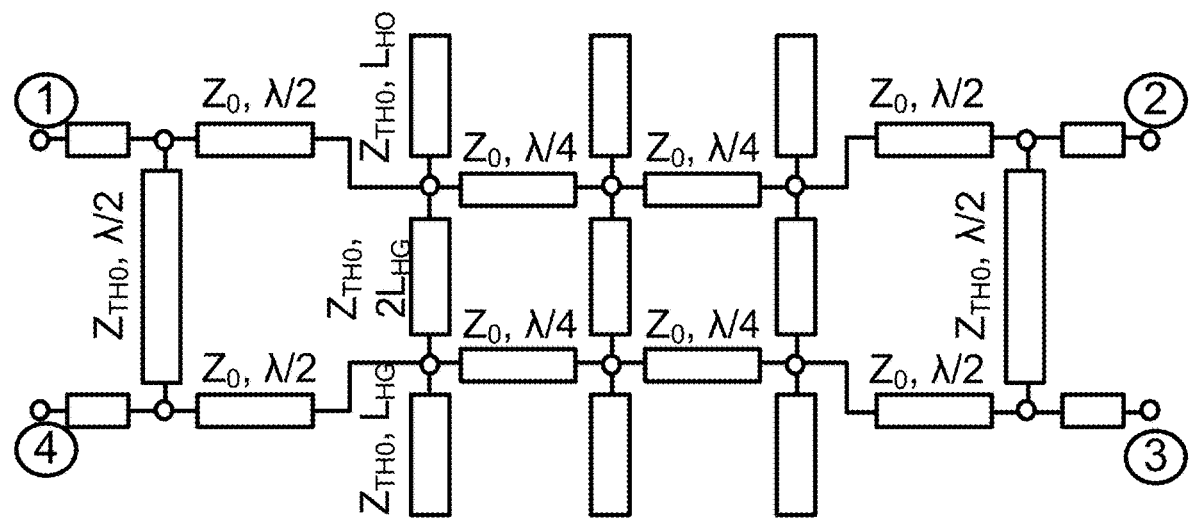
FIG. 4D shows a differential bandpass filter, according to various embodiments.
Figure 5A:
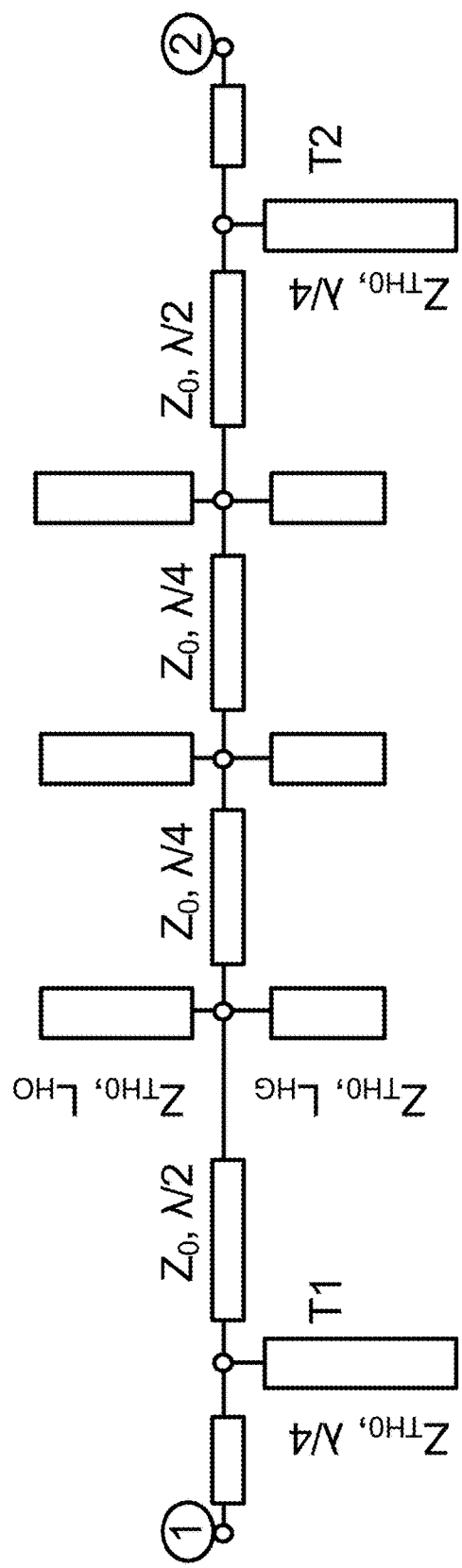
FIG. 5A shows a simplified diagram of a differential bandpass filter with a common or even mode, according to various embodiments.

A differential input, differential output (DIDO) BPF can be based on the structure shown in FIG. 4D. The common mode and differential modes half-equivalent circuits can be represented by FIGS. 5A and 5B, respectively. In odd or DM mode, the input power is ideally totally transmitted to the output load under matching conditions. It is essential to use a half-wavelength line between the shorted resonators and the hybrid resonators for wideband matching. On the other hand, no power is transmitted to the output in CM operation as the input and output open-ended T-structure (T1 and T2) in FIG. 5A constitutes a notch at the center frequency of the BPF. The Common-mode and differential mode S-parameters can be estimated by $S_{11,DD}=(S_{11}-S_{41}-S_{14}+S_{44})/2$, $S_{21,DD}=(S_{21}-S_{31}-S_{24}+S_{34})/2$, $S_{11,CC}=(S_{11}+S_{41}+S_{14}+S_{44})/2$, and/or $S_{21,CC}=(S_{21}+S_{31}+S_{24}+S_{34})/2$.

Figure 5B:
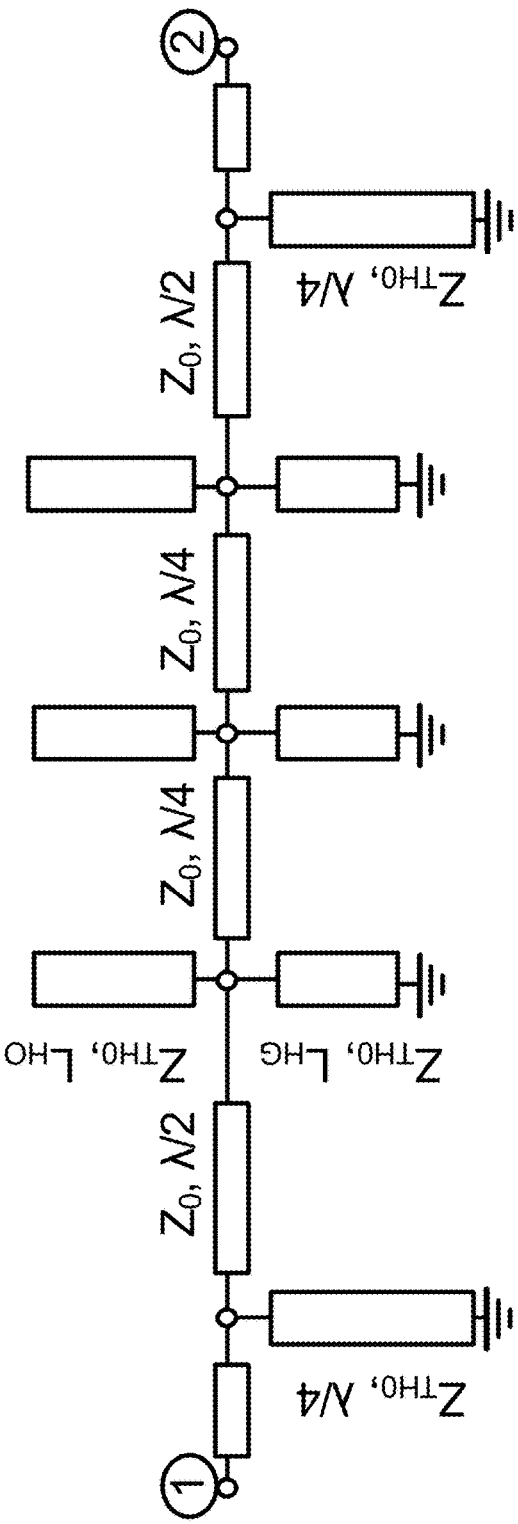
FIG. 5B shows a simplified diagram of a differential bandpass filter with a differential or odd mode, according to various embodiments.
Figure 6A:
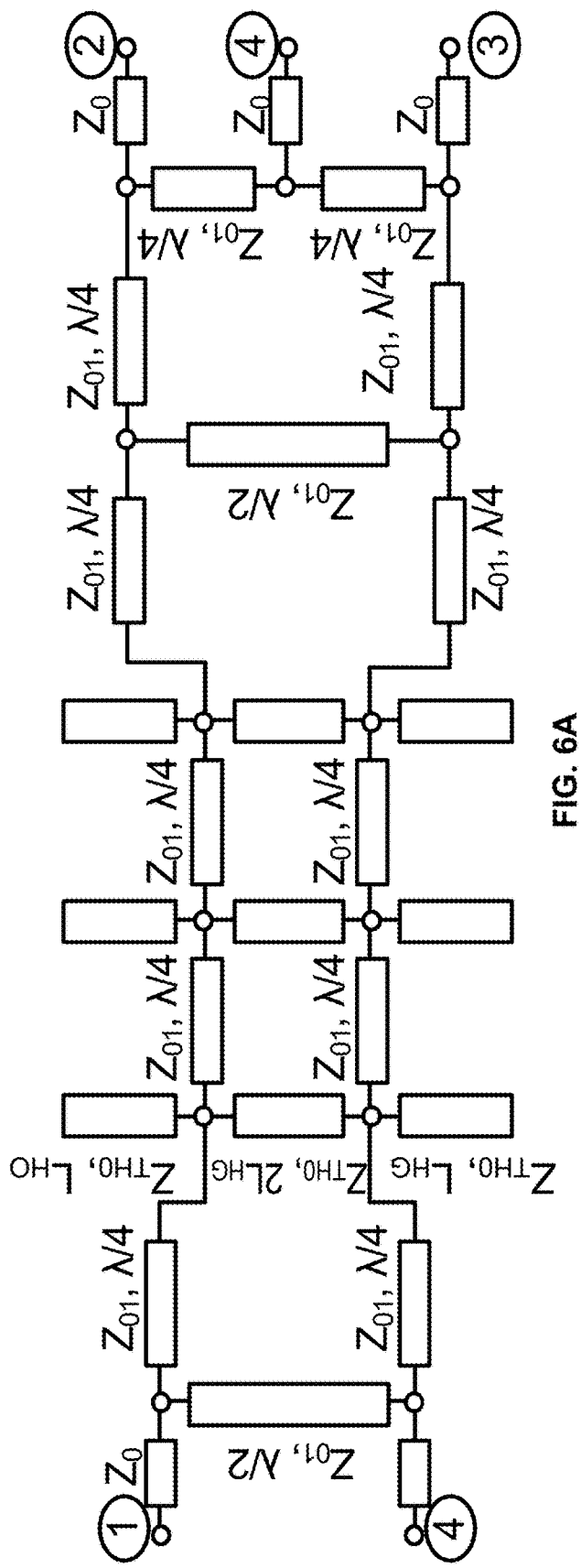
FIG. 6A shows a schematic of a single input, dual output/dual input, single output bandpass filter, according to various embodiments.
Figure 6B:
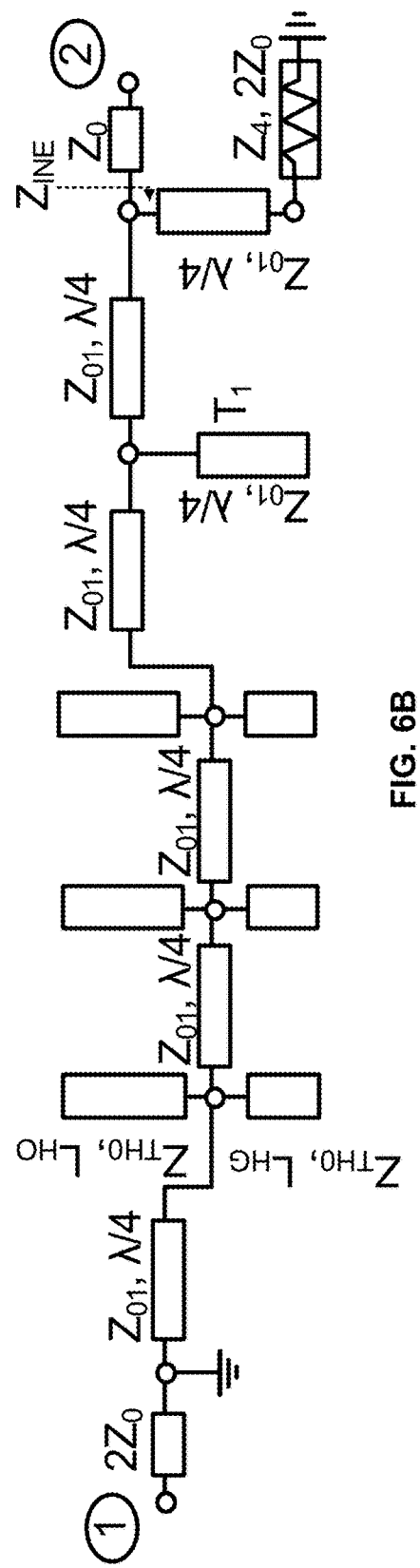
FIG. 6B shows an even mode half-circuit of the single input, dual output/dual input, single output bandpass filter of FIG. 6A, according to various embodiments.

The Schematic of the proposed SIDO/DISO is given in FIG. 6A. For the SIDO operation, port 1 corresponds to the input whereas ports 2 and 3 are the output ports. The port attribution are reversed in the case of DISO application mode. Port 4 is the isolation port and can be connected to a 50Ω resistor. This allows the filter to be used as a power splitter/combiner with filtering effect. During the CM operation, the signals at port 2 and 3 are equal with no phase difference. Hence, the resulting simplified schematic is depicted in FIG. 5(b). The open-ended T-structure T1 acts like a ground, blocking the signal transmission from port 2 to port 1. The input matching is maintained thanks to the impedance of the isolation port (port 4) and by setting $$Z_{01} = Z_0\sqrt{2}$$

and $$Z_{INE} = \frac{Z_{01}^2}{Z_4} = \frac{(Z_0\sqrt{2})}{2Z_0} = Z_0.$$

The even mode reflection coefficient and gain are ideally 0.

Figure 6C:
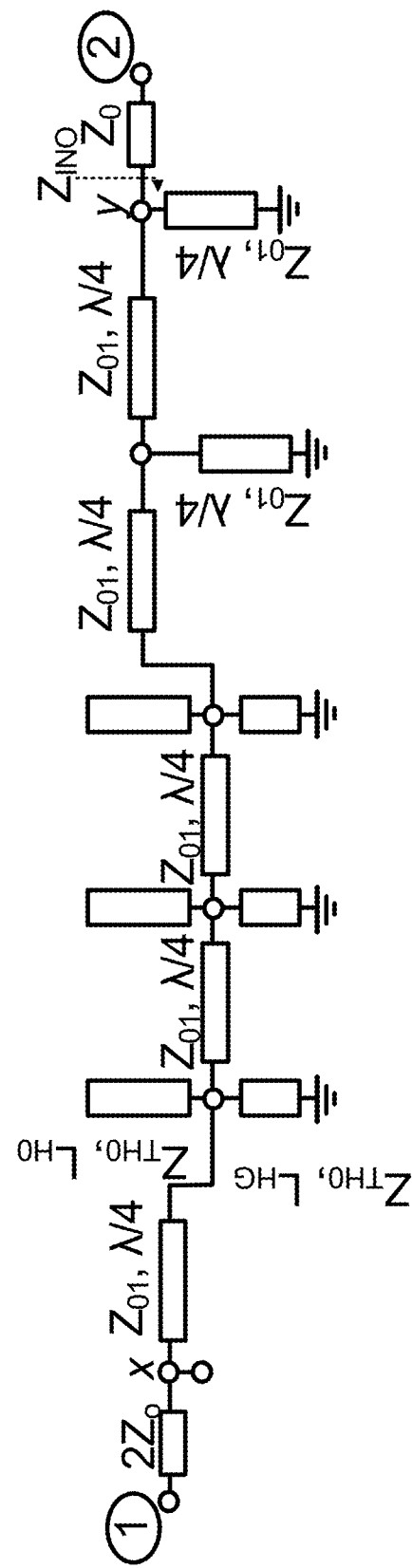
FIG. 6C shows an odd mode half-circuit of the single input, dual output/dual input, single output bandpass filter of FIG. 6A, according to various embodiments.

During the DM, there can be a 180° phase shift between the signals at port 2 and 3. The half-circuit of the odd mode operation is represented in FIG. 6C. The input and output matching are maintained by setting $Z_{01}=Z_0\sqrt{2}$ and the total length between node x and y to a multiple of the quarter-wavelength. Therefore, the ideal reflection coefficient and gain of the odd mode are 0 and 1, respectively. The S-parameters of the differential and common modes can be computed by assuming an ideal BALUN transforming the differential end of the filter into a single end. The resulting equations for the filter in FIG. 6A assuming port 4 is loaded with a 50Ω resistor are $S_{11,D}=S_{11,C}=S_{11}$, $S_{21,D}=(S_{21}-S_{31})/\sqrt{2}$, $S_{22,D}=(S_{22}-S_{32}-S_{23}+S_{33})/2$, and $S_{22,C}=(S_{22}+S_{32}+S_{23}+S_{33})/2$.

The quarter-wavelength ($\lambda_0/4$) and/or the half-wavelength ($\lambda_0/2$) can be computed based on the used transmission line. For instance, if the microstrip line is used, the guided wavelength can be found by using the specification of the PCB, including the permittivity of the substrate, the height of the substrate, the thickness and conductivity of the metal cladding. Moreover, the bandwidth adjustment can be done by properly selecting the dimensions of the tails of the hybrid T-resonators as seen from FIG. 4D and FIG. 6A.

Since the bandwidth of the hybrid resonator is narrower compared to that of the grounded T-resonator, the overall bandwidths of the proposed designs are imposed by the 3rd order hybrid structure. The 3 dB bandwidth is therefore found by $$|S_{21}|^2 \approx \left|\left(\frac{-2Z_0(\tan\beta l_{HG})}{2Z_{TH0}\tan\beta l_{HG} + jZ_0(\tan\beta l_{HG}\tan\beta l_{HO} - 1)}\right)^3\right|^2 = \frac{1}{2},$$

where $$l_{HG} + l_{HO} = \lambda_0/4.$$

It can be assumed that $Z_{TH0}=Z_0=50$, such that the bandwidth will be obtained in terms of length of the hybrid sections only. Furthermore, if $l_{HO}=l_{HG}=\lambda_0/8$, the phase constant can be computed to obtain the corresponding cutoff frequencies $$f_{LC} = \frac{c\beta_1}{2\pi\sqrt{\varepsilon_{reff}}} \approx \frac{2.2 f_0}{\pi}$$

and $$f_{UC} = \frac{c\beta_2}{2\pi\sqrt{\varepsilon_{reff}}} \approx \frac{4.1 f_0}{\pi}$$

where $f_{LC}$ and $f_{UC}$ are the lower and upper cutoff frequencies, respectively, c the speed of light and $\varepsilon_{reff}$ the effective dielectric constant of the substrate.

The bandwidth of the third order BPF can be obtained using $$BW = f_{UC} - f_{LC} \approx \frac{1.9 f_0}{\pi} = 0.6 f_0.$$

Figure 7:
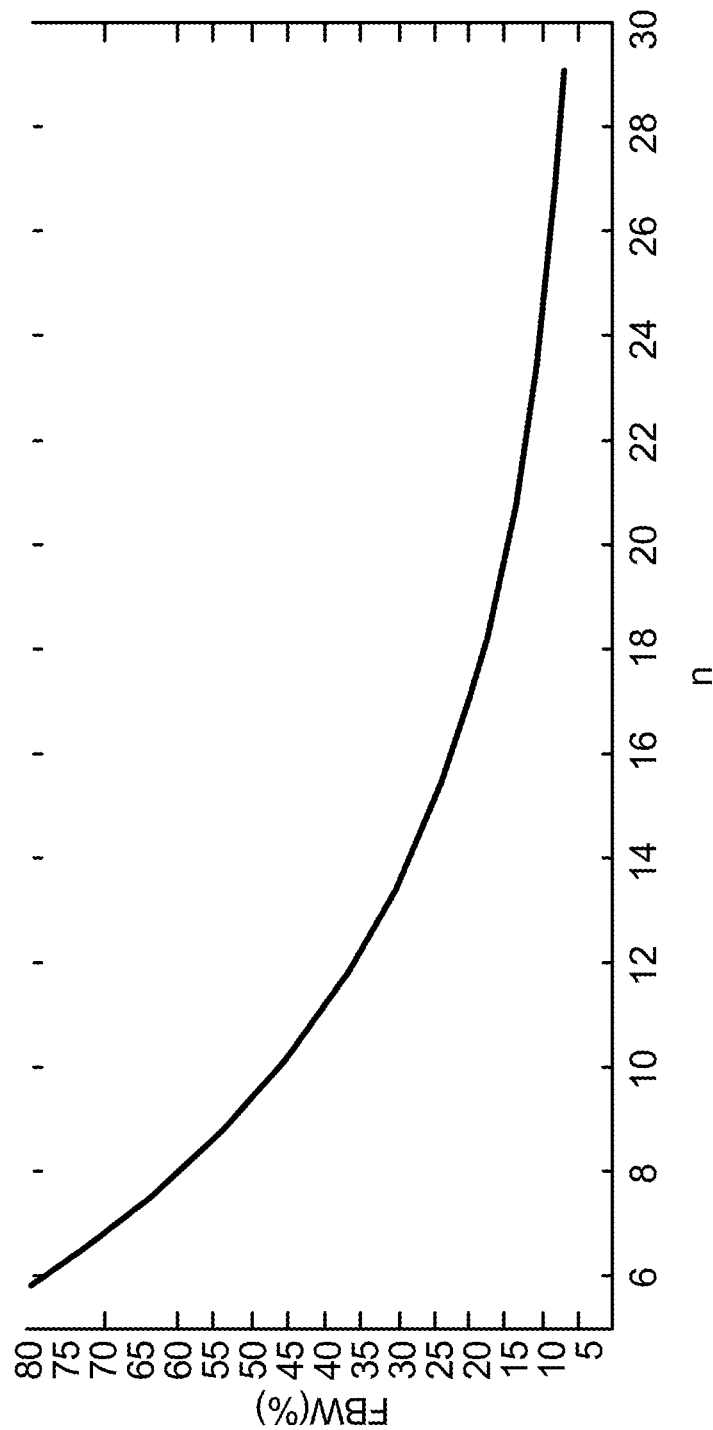
FIG. 7 shows a graph showing the fractional bandwidth versus n, according to various embodiments.

The BPF exhibits 60% fractional bandwidth when $l_{HO}=l_{HG}=\lambda_0/8$. To obtain the bandwidth given an arbitrary $l_{HG}$ or $l_{HO}$ value, let's assume $l_{HG}=\lambda_0/n$ and $l_{HO}=\lambda_0/4-l_{HG}$. The values of $\beta l_{HG}$ and $\beta l_{HO}$ become $$\frac{2\pi}{n}\frac{f}{f_0}$$

and $$2\pi\left(\frac{n-4}{4n}\right)\frac{f}{f_0},$$

respectively. The fractional bandwidth can therefore be obtained for different values of n (e.g., as shown in FIG. 7). By choosing the desired FBW, the corresponding $l_{HG}$ and $l_{HO}$ can be found, which are related to n and $\lambda_0$. Lastly, the EM simulation can be performed to adjust the line dimensions.

In illustrative examples, a DIDO filter and a SIDO filter are provided. The DIDO and SIDO filters can include center frequencies of 28.5 GHz and 29 GHz, respectively. The DIDO and SIDO filters can include a substrate with a dielectric constant of 2.93, a thickness of 0.127 mm and a loss tangent of 0.0013. The design parameters of the filters are given in Table I and the optimum physical parameters of the filters are displayed in Table II. The optimum physical parameters of the filters can be based on the layouts shown in FIG. 8. Ignoring the loss associated with higher order modes, the maximum expected insertion loss generated by the filters including the 50Ω input and output line extension to accommodate the connectors is about 1.66 dB. This value assumes perfect matching at the center frequency and does not account for the connector loss.

TABLE I

Design parameters of the DM bandpass filters.

| Parameter | DIDO | SIDO |
|---|---|---|
| $f_0$ (GHz) | 28.5 | 29 |
| $\lambda_0$ (mm) | 6.9 | 6.8 |
| FBW (%) | 23 | 17 |
| n | 16 | 19 |
| $l_{HG}$ (mm) | 0.43 | 0.36 |
| $l_{HO}$ (mm) | 1.29 | 1.34 |

TABLE II

Optimum physical dimensions of the bandpass filters.

| Unit: mm | DIDO | SIDO |
|---|---|---|
| $W_o$ | 0.3 | 0.3 |
| $L_o$ | 1.85 | 1.8 |
| $W_H$ | 0.3 | 0.3 |
| $L_{HO}$ | 1.06 | 1.18 |
| $L_{HG}$ | 0.35 | 0.35 |
| $L_1$ | 1.85 | 1.8 |
| $L_2$ | 1.7 | 1.5 |
| $L_3$ | 0.1 | 1.3 |
| $L_4$ | 1.34 | — |
| $W_1$ | — | 0.15 |

Figure 9A:
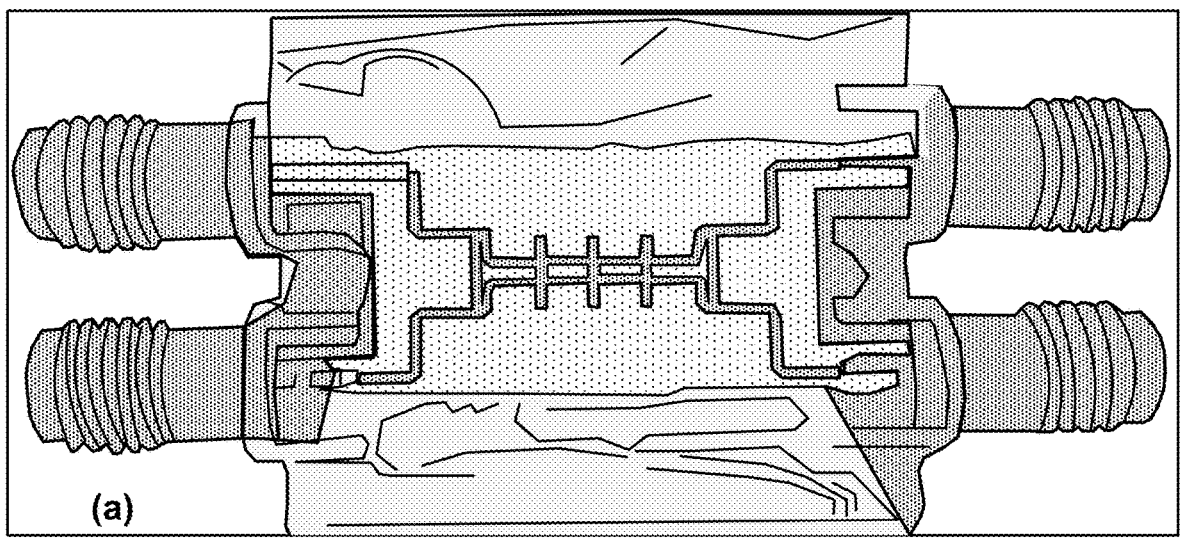
FIG. 9A shows an example of a dual input, dual output bandpass filter, according to various embodiments.
Figure 9B:
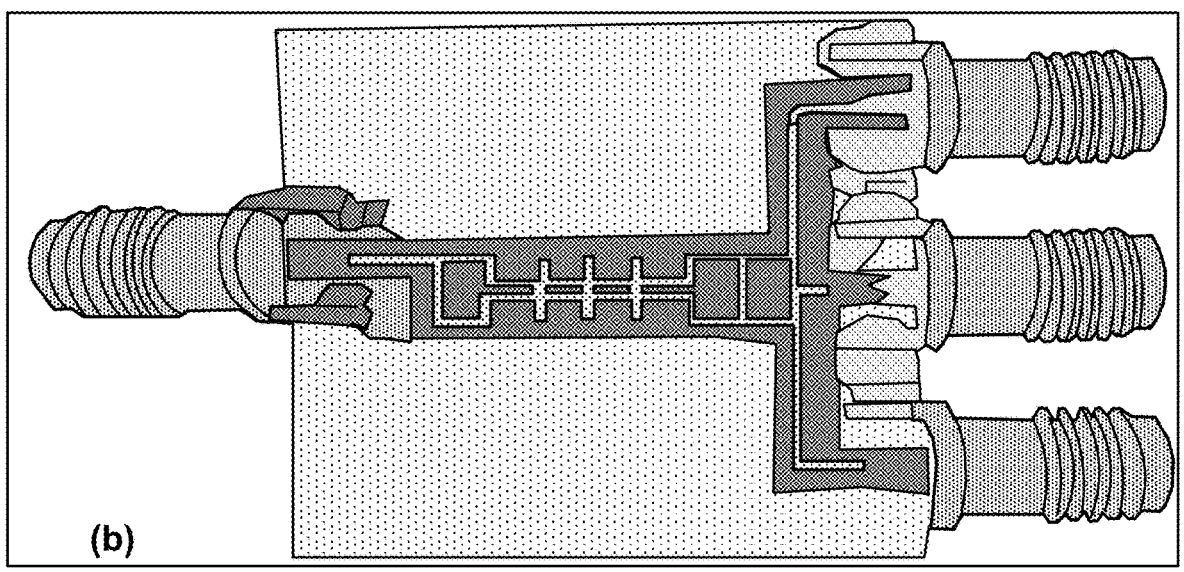
FIG. 9B shows an example of a single input, dual output bandpass filter, according to various embodiments.
Figure 10A:
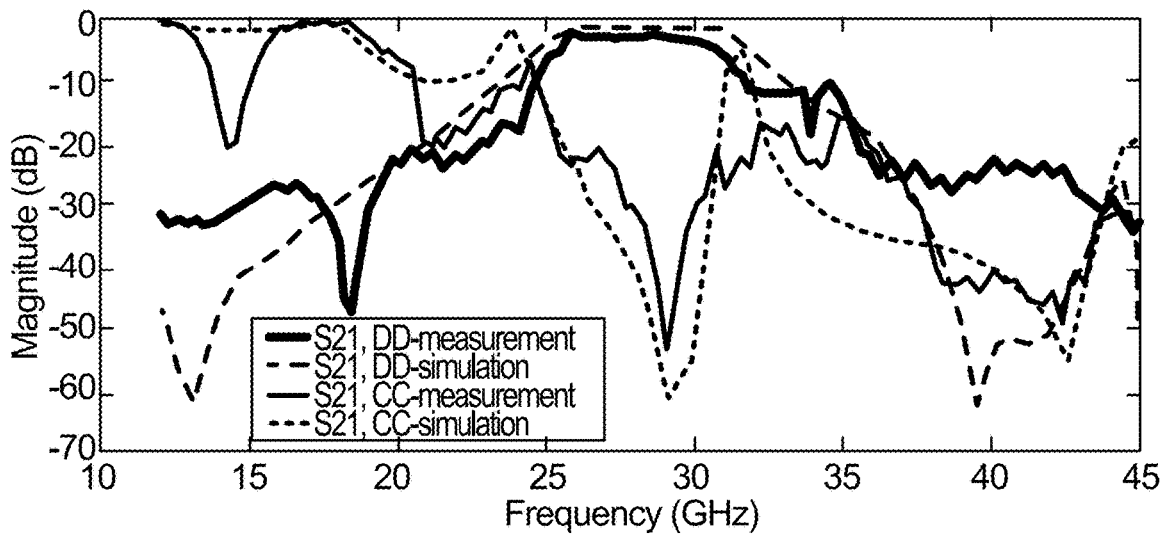
FIGS. 10A through 10D show graphs showing simulated and measured results of balanced bandpass filter prototypes, according to various embodiments.
Figure 10B:
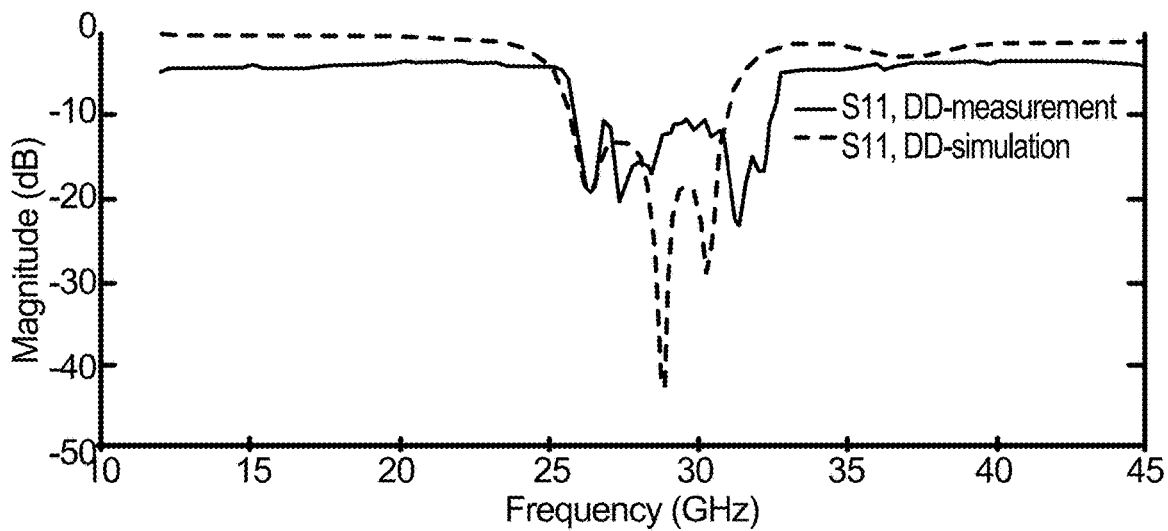
Figure 10C:
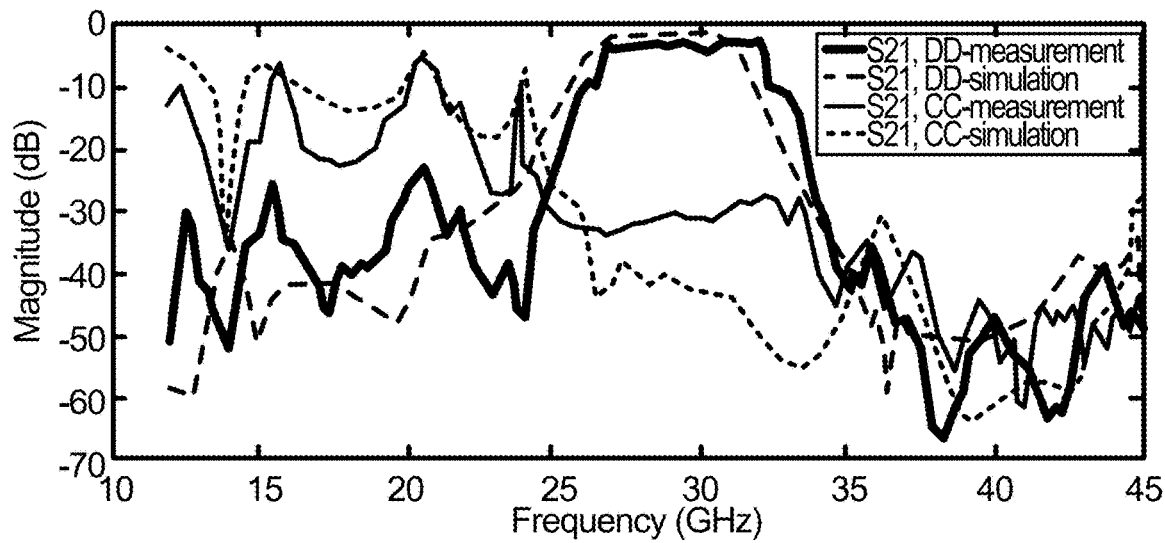
Figure 10D:
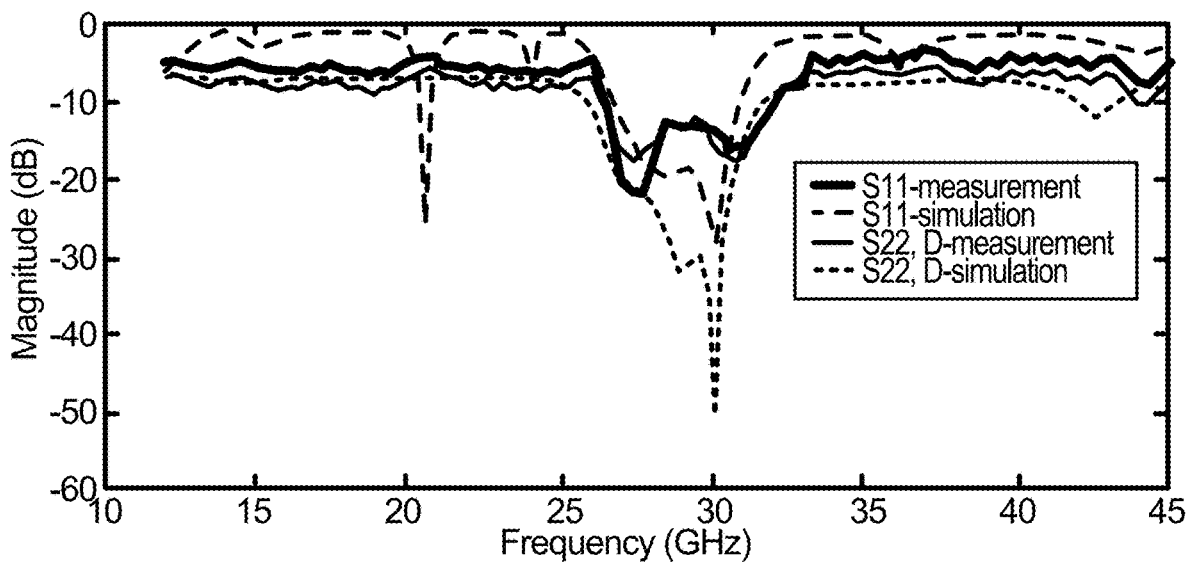

The example DIDO and SIDO filters are shown in FIG. 9 and example measurements using the filters are shown in FIG. 10. As shown in FIG. 10, The center frequency ($f_0$) and bandwidth (BW) of the measured DIDO filter are 28.2 GHz and 5.3 GHz, respectively. The measured insertion loss (IL), return loss (RL) and CM suppression including the connector loss are 2.7 dB and 14 dB and 47 dB at the center frequency of the filter. The stopband attenuation of the filter is more than 27 dB at ±15% $f_0$.

The performance of the measured single-ended-to-balanced filter match with the simulation results as well with $f_0$, BW, IL, RL, and CM suppression at f0 of 29.5 GHz, 5.9 GHz, 3.02 dB, 13 dB and 30.5 dB, respectively. In addition, the obtained stopband attenuation at ±15% F0 is at least 30 dB. The proposed balanced filters have high CM suppression and stopband attenuation. Furthermore, the filters can be compatible with CMOS SOI processes since coplanar waveguides can be used as transmission lines. In various embodiments, the area of the structure can be reduced by employing line bending technique.

Microstrip transmission lines exhibit high losses at higher frequencies that increase the insertion loss of the designed BPFs. In addition to the loss from the main structures, other losses include the soldering loss, the connector loss and the loss associated with the extension lines for accommodating the connector size. These losses are inevitable as the connectors are required for measuring the modules. However, the connector loss can be estimated using the formula on the manufacturer's data sheet as: 0.03*sqrt(f_GHz) dB. Therefore, the total loss of the 4 connectors used in each design will be 0.655 dB at 30 GHz. Moreover, the total connector line extension lengths for the measured DIDO and SIDO filters are approximately 40 mm and 36 mm, respectively, corresponding to a total conductor and dielectric loss of 0.76 dB and 0.684 dB, respectively. Therefore, the total loss associated with the connectors can be theoretically estimated to be about 1.415 dB and 1.339 dB for the DIDO and SIDO filters, respectively. It is worth mentioning that these prototypes are meant for proof-of-concept of the idea. Moreover, this work presents a general design methodology of transmission line-based bandpass filters, which may be designed at lower frequencies as well. Future works include the implementation of transmitter and receiver antenna integrated BPFs in CMOS process. The integration of the DM BPF eliminates the loss associated with connectors and reduces the radiation loss since coplanar waveguides may be use as transmission lines. Therefore, the resulting insertion loss may be significantly reduced.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An electronic communication system comprising:
   a signal generator;
   bandpass filter coupled with the signal generator, the bandpass filter comprising:
   an input port configured to receive a signal that is generated based on an output of the signal generator;
   an output port; and
   a resonator coupled between the input port and the output port, the resonator configured to output the signal to the output port at a resonance frequency;
   an amplifier coupled to the output port of the bandpass filter; and
   an antenna coupled to the amplifier.

2. The electronic communication system of claim 1, wherein the bandpass filter is a single input, dual output bandpass filter comprising one input port for receiving an input signal and first and second output ports for outputting first and second signals.

3. The electronic communication system of claim 2, wherein the first and second signals are equal with no phase difference.

4. The electronic communication system of claim 2, wherein the first and second signals have a 180 degree phase shift between the first and second signals.

5. The electronic communication system of claim 2, further comprising an isolation port coupled with a resistor.

6. The electronic communication system of claim 2, wherein the bandpass filter comprises a substrate having a dielectric constant between 2.5 and 3 and a thickness between 0.1 and 0.2.

7. The electronic communication system of claim 1, wherein the bandpass filter is a dual input, single output filter comprising first and second input ports for receiving first and second signals and an output port for outputting an output signal.

8. The electronic communication system of claim 7, wherein the first and second signals are equal with no phase difference.

9. The electronic communication system of claim 7, wherein the first and second signals have a 180 degree phase shift between the first and second signals.

10. The electronic communication system of claim 7, further comprising an isolation port coupled with a resistor.

11. The electronic communication system of claim 1, wherein the bandpass filter is a dual input, dual output filter comprising first and second input ports for receiving first and second signals and multiple output ports for outputting one or more signals.

12. The electronic communication system of claim 11, wherein the first and second signals are equal with no phase difference.

13. The electronic communication system of claim 11, wherein the first and second signals have a 180 degree phase shift between the signals.

14. A microstrip bandpass filter system comprising:
    an input port configured to receive a signal that is generated based on an output of a signal generator;
    an output port;
    a resonator coupled between the input port and the output port, the resonator configured to output the signal to the output port at a resonance frequency;
    an amplifier coupled to the output port; and
    an antenna coupled to the amplifier.

15. The microstrip bandpass filter system of claim 14, wherein the resonator has a T-shaped structure.

16. The microstrip bandpass filter system of claim 15, wherein the resonator comprises an edge coupled line.

17. The microstrip bandpass filter system of claim 15, wherein the resonator is a grounded, un-grounded, or hybrid resonator.

18. A method, comprising:
    inputting to a bandpass filter a signal, wherein the bandpass filter comprises:
        an input port configured to receive the signal that is generated based on an output of a signal generator;
        an output port; and
        a resonator coupled between the input port and the output port, the resonator configured to output the signal to the output port at a resonance frequency;
    receiving, from the bandpass filter, the signal at the resonance frequency;
    conditioning, by an amplifier coupled to the output port, the signal; and
    transmitting, by an antenna coupled to the amplifier, the conditioned signal.

19. The method of claim 18, wherein inputting the signal to the bandpass filter comprises inputting the signal into a plurality of input ports.

20. The method of claim 18, wherein receiving the signal from the bandpass filter comprises receiving the signal by a plurality of output ports.

\* \* \* \* \*